(12) United States Patent
Dao et al.

(10) Patent No.: US 11,881,993 B2
(45) Date of Patent: Jan. 23, 2024

(54) METHOD AND DEEP REINFORCEMENT NEURAL NETWORK (DRNN) MANAGEMENT SYSTEM FOR AN INTELLIGENT PLUG-AND-PLAY POINT-TO-MULTIPOINT INTERNET OF THINGS (IOT) PLATFORM

(71) Applicants: Bang Tran Dao, Binh Dinh (VN); Long Hong Le, Binh Dinh (VN); Hau Van Huynh, Tien Giang (VN); Canh Huu Nguyen, Ho Chi Minh (VN); Son Giang Lam, Ho Chi Minh (VN)

(72) Inventors: Bang Tran Dao, Binh Dinh (VN); Long Hong Le, Binh Dinh (VN); Hau Van Huynh, Tien Giang (VN); Canh Huu Nguyen, Ho Chi Minh (VN); Son Giang Lam, Ho Chi Minh (VN)

(73) Assignee: EOH LIMITED LIABILITY COMPANY, Ho Chi Minh (VN)

( * ) Notice: Subject to any disclaimer, the term of this patent is extended or adjusted under 35 U.S.C. 154(b) by 0 days.

(21) Appl. No.: 17/646,711

(22) Filed: Dec. 31, 2021

(65) Prior Publication Data
US 2022/0131745 A1 Apr. 28, 2022

Related U.S. Application Data

(63) Continuation-in-part of application No. 17/068,952, filed on Oct. 13, 2020.

(51) Int. Cl.
*H04L 41/0806* (2022.01)
*G16Y 30/00* (2020.01)
(Continued)

(52) U.S. Cl.
CPC .......... *H04L 41/0809* (2013.01); *G16Y 30/00* (2020.01); *H04L 12/2861* (2013.01);
(Continued)

(58) Field of Classification Search
CPC ....... G16Y 10/00–90; G16Y 20/00–40; G16Y 30/00–10; G16Y 40/00–60;
(Continued)

(56) References Cited

U.S. PATENT DOCUMENTS

| 10,262,019 B1 * | 4/2019 | Reiner .................... H04L 67/10 |
| 2005/0172024 A1 * | 8/2005 | Cheifot ................... H04L 67/12 |
| | | 709/225 |

(Continued)

OTHER PUBLICATIONS

T. Chen, S. Barbarossa, X. Wang, G. B. Giannakis and Z.-L. Zhang, "Learning and Management for Internet of Things: Accounting for Adaptivity and Scalability," in Proceedings of the IEEE, vol. 107, No. 4, pp. 778-796, Apr. 2019.*

(Continued)

*Primary Examiner* — Brendan Y Higa

(57) ABSTRACT

An Internet of Things (IoT) system is disclosed which includes: a network; a plurality of IoT servers coupled together and serviced by the network; a plurality of IoT agents coupled to each other and to the plurality of IoT servers; and a plurality of IoT devices electrically coupled to the plurality of IoT agents, wherein the IoT servers and the IoT agents further includes a deep reinforcement neural network operative to generate an action map $\{a_t\}$ so as to satisfy an $$\operatorname*{argmax}_{a_t} Q(s, a, \pi)$$

wherein $Q(s,a)=E[R_t|(s, a)]$.

16 Claims, 8 Drawing Sheets

(51) Int. Cl.
*H04L 69/18* (2022.01)
*H04L 41/142* (2022.01)
*H04L 45/16* (2022.01)
*H04L 43/0876* (2022.01)
*H04L 41/0823* (2022.01)
*H04L 41/16* (2022.01)
*H04L 67/025* (2022.01)
*H04L 67/01* (2022.01)
*H04L 12/28* (2006.01)

(52) U.S. Cl.
CPC ........ *H04L 41/0823* (2013.01); *H04L 41/142* (2013.01); *H04L 41/16* (2013.01); *H04L 43/0876* (2013.01); *H04L 45/16* (2013.01); *H04L 67/01* (2022.05); *H04L 67/025* (2013.01); *H04L 69/18* (2013.01)

(58) Field of Classification Search
CPC . H04L 12/2803–2836; H04L 29/06068; H04L 29/08558; H04L 41/0803–0809; H04L 41/823–0836; H04L 41/12; H04L 41/16; H04L 41/22; H04L 45/16; H04L 69/08; H04L 41/08–0809; H04L 41/0893–0897; H04L 41/04–044; H04L 41/0806–0809; H04L 41/142; H04L 41/0823–0836; H04L 67/12–125; H04W 84/18–22; H04W 24/02
See application file for complete search history.

(56) References Cited

U.S. PATENT DOCUMENTS

| | | | |
|---|---|---|---|
| 2010/0293220 A1* | 11/2010 | Gennari | G08B 13/19645 709/202 |
| 2012/0320923 A1* | 12/2012 | Vasseur | H04L 45/22 370/400 |
| 2015/0006450 A1* | 1/2015 | Ferre | G05B 15/02 706/14 |
| 2017/0048079 A1* | 2/2017 | Nethi | H04L 12/2836 |
| 2017/0105131 A1* | 4/2017 | Song | H04W 4/80 |
| 2017/0201585 A1* | 7/2017 | Doraiswamy | H04W 4/38 |
| 2018/0020329 A1* | 1/2018 | Smith | H04L 67/12 |
| 2018/0041566 A1* | 2/2018 | Huang | H04L 67/02 |
| 2018/0063851 A1* | 3/2018 | Abraham | H04W 16/14 |
| 2018/0123820 A1* | 5/2018 | Kim | H04W 4/70 |
| 2018/0270310 A1* | 9/2018 | Venkatesan | H04L 29/08189 |
| 2020/0177485 A1* | 6/2020 | Shurtleff | H04L 41/142 |
| 2022/0124543 A1* | 4/2022 | Orhan | G06N 3/006 |
| 2022/0311678 A1* | 9/2022 | Karjee | H04L 41/16 |

* cited by examiner

METHOD AND DEEP REINFORCEMENT NEURAL NETWORK (DRNN) MANAGEMENT SYSTEM FOR AN INTELLIGENT PLUG-AND-PLAY POINT-TO-MULTIPOINT INTERNET OF THINGS (IOT) PLATFORM

CLAIM OF PRIORITY

This application is a continuation-in-part application under 35 U.S.C. § 120 of application Ser. No. 17/068,952, entitled "Intelligent Plug-and-Play Point-to-Multipoint Internet of Things (Iot) Platform and Method of Managing and using the Same", filed on Oct. 13, 2020. The parent application is incorporated herewith in its entirety for references.

FIELD OF THE INVENTION

The present invention relates generally to an Internet of Things (IoT) platform. More specifically, the present invention relates to an autonomous Internet of Things (IoT) platform (AIoT) capable of providing plug-and-play (PnP) and point to multipoint (P2MP) communication between different IoT devices.

BACKGROUND ART

The uses of Internet of Things (IoT) devices are increasing exponentially at a dizzy pace. By 2020, there are 50 billion IoT devices. At this growing rate, by 2025, the IoT will exceed 100 billion connected devices. The Internet of Things (IoT) devices are the network of smart devices embedded with sensing, actuating, software, and network connectivity to sense and exchange data between the IoT devices and with the outside world. IoT applications include smart parking, remote health monitoring, disease detection and monitoring, crop monitoring, accident prediction and detection, traffic monitoring, robotic rescue mission, environment pollution monitoring, unmanned aerial vehicle (UAV) rescue operation, which integrates and enables ambient sensing, ubiquitous communications, intelligent analytics, and pervasive computing. However, these developments of the IoT devices became complicated and slowed down because of the lacks of standardization and interoperabilities.

The Internet of Things (IoT) connects a vast number of IoT devices together to form a smart grid that generates massive amount of sensory data to reflect the status of the physical world. Evidently, this requires an internal management system and method to handle the interconnectivities among a vast amount of IoT devices. So far, machine learning, Internet of Things, and autonomous control system (ACS) are investigated in the academic realm only. Real-world solutions for intercommunication among the IoT devices that meet the bandwidth, efficiency, and power consumption requirements are still needed to reliably furnish big data to the analytic tasks. Furthermore, academic stuties are limited to the IoT system with ambient intelligence. That is, these studies are only directed to achieve dynamic and interactive IoT devices that operate based on the conditions of the surrounding environment. In other words, the data from these IoT devices are processed and analyzed by leveraging machine learning (ML) techniques, with the objective of making informed decisions to control the reactions of IoT devices to the physical world. For example, dynamic and interactive IoT thermostat learn to autonomously control central heating systems based on the presence of users and their routine. These academic stuties do not address the issues of internal management of intercommunication between IoT devices to reduce latency, inactivitiy, and network unstability. For example, there is a need for an internal management system that can decide which IoT cameras in a smart city X that can communicate with other IoT cameras and other IoT devices in a second smart city Y to avoid traffic jams. Additionally, there is a need for management system that can facilitate a decentralized IoT environment similar to blockchain in which the IoT devices can point to multi point (P2MP) communicate among one another without being arbitered by a central network.

Furthermore, at the present time, new IoT devices cannot be readily connected to the existing IoT environments in a plug-and-play (PnP) manner because many IoT devices have been deployed with their own proprietary protocols. IoT devices manufactured in different countries and regions around the world are based on different industrial standards such as IEEE, Internet Engineering Task Force (IETF), ITU-T, OneM2M, 3GPP, Telecommunication Standards Development Society, India (TSDSI), Global ICT Standardization Forum for India (GISFI), Bureau of Indian Standards (BIS), Korean Agency for Technology and Standards (KATS), CISCO, IBM, Gartner, IDC, Bosch, and European Telecommunications Standards Institute. This fragmentation of standards makes the communication between different IoT devices difficult, if not impossible. At the present time, to deploy new IoT devices, the developers have to build the entire platform from ground up including network protocols, infrastructure, hardware, software, services, and device drivers. This will limit the full connectivity and usability for users of IoT devices.

Beside connectivity issues, new IoT devices connected to excising IoT environments cannot communicate to the existing IoT devices due to the differences in their industrial standards, communication protocols, manufacturers, and physical connections. Consequently, the expansions of IoT devices result in segmented networks of IoT devices that cannot communicate to one another. This increases complexities, latencies, costs, and inefficiencies of the present IoT environments. Furthermore, the lack of standardization prevents point to multipoint communication and seamless connectivities, thus hampering the intelligent analysis and intelligent actions for artificial intelligence and machine learning—an inherent characteristics of the Internet of Things (IoT).

There exist many attempts to solve the above problems. Standardization bodies have tried to standardize the Internet of Things (IoT). However, the standardization efforts are only within their own industries. For example, IEEE has their own standardization rules, IETF, One M2M, OASIS have theirs, etc. This results in myriads of standardizations for the Internet of Things (IoT). Other inventors and private firms have also tried to solve the standardization and connectivity problems for the Internet of Things (IoT). In the U.S. patent application publication No. US-2015/0019714 by Shaashua et al. (hereinafter referred to as "Shaashua publication"), the inventors tried to solve the communication between different IoT environments. The Shaashua publication provides an interoperable system that includes an integration interface 114 and the integration service system 112 that can cross-connect IoT devices from different vertical IoT environments such as connected device A 102A in the cloud service A and connected device B 102B and connected device C 102C in the cloud serve B 106B. The Shaashua publication discloses, "For device-based integration, the integration application 328 may communicate with the IoT devices 324 belonging to different vertical solutions via an open protocol." (Shaashua, page 3, ¶[0043]). Thus, the Shaashua publication teaches a cross-communication between IoT devices connected to different cloud services and having different manufacturing standards as well as communication protocols. However, the Shaashua publication fails to teach plug-and-play (PnP) of newly connected IoT devices and point-to-multipoint communications. The Shaashua publication focuses more on how to profiling a user than solving the plug-and-play and point to multipoint communication problems for existing IoT environments. The Shaashua publication monitors the physical environment to obtain the semantics of an entity. Furthermore, in the Shaashua system, the integration application and the integration service system only serve as intermediator or gateway for the communication between IoT devices of two different cloud servers. That is, it would take many integration service systems and integration applications of the Shaashua publication to provide point to multipoint communication in a large IoT environment having many vertical integration systems. This would increase complexities and costs. Furthermore, as the number of IoT devices increases, Shaashua's method does not guarantee point to multipoint communication for a large number of IoT devices in a large IoT environment. Shaashua also fails to teach the set up for such point to multipoint communication.

Therefore what is needed is a smart IoT management system that can efficiently and effectively manage the connectivities of a vast amount of IoT devices.

What is needed is a smart IoT management system that can facilitate the decentralized point to multiple point (P2MP) communication among different IoT devices.

Therefore what is needed is a smart IoT management system that provides an IoT environment that can provide plug-and-play between IoT devices regardless of their communication protocols established by their own manufacturers, industrial standards, and physical connections.

In addition, what is needed is an IoT agent/server, when connected, that can selectively provide plug-and-play (PnP) and point-to-multipoint (P2MP) communication not only between IoT devices but also between their gateways and servers levels.

What is needed is an IoT management system that can decide connections between newly connected and existing IoT environments, hubs, gateways, and IoT devices based on some chosen criteria such as bandwidths, power consumption, and speed.

The IoT environment and accompanying artificial intelligence based IoT gateway as well as software program of the present invention solve the above needs.

SUMMARY OF THE INVENTION

Accordingly, an object of the present invention is to provide an Internet of Things (IoT) environment managed by a deep reinforcement neural network (DRNN) which includes: a network; a plurality of IoT servers coupled together and serviced by the network; a plurality of IoT agents coupled to each other and to the plurality of IoT servers; and a plurality of IoT devices electrically coupled to the plurality of IoT agents, wherein the IoT servers and the IoT agents of the present invention further includes a deep reinforcement neural network (DRNN) operative to (i) generate an action map $\{a_t\}$; (ii) receive observations regarding bandwidths, transmission rate, and power consumptions and calculate a cumulative reward function $R_t$ and an $$\underset{a_t}{\arg\max} Q(s, a, \pi)$$

wherein $Q(s, a)$ is the maximum expected value of the reward function $R_t$ and $Q(s, a)$ is written as $$\underset{a_t}{\arg\max} Q(s, a, \pi) = E[R_t \mid (s, a)],$$

where E is an expected value of the value function $Q(s, a,)$; wherein the cumulative reward function $R_t$ is a function of total required bandwidth, transmission rate, and total power consumption used in a chosen action map $\{a_t\}$; (iii) if the $$\underset{a_t}{\arg\max} Q(s, a, \pi)$$

is not achieved, then select another action map $\{a_{t+1}\}$ that yields the highest probability of achieving $$\underset{a_t}{\arg\max} Q(s, a, \pi)$$

that meets both bandwidth and power consumption requirements; otherwise, use the action map $\{a_t\}$ to program a webapp configuration program.

An object of the present invention is to provide an Internet of Things (IoT) platform (econsystem) which includes: a network; a plurality of IoT servers coupled together and serviced by the network; a plurality of IoT agents coupled to each other and to the plurality of IoT servers; and a plurality of IoT devices electrically coupled to the plurality of IoT agents, wherein the IoT servers and the IoT agents of the present invention are operable to configure a plug-and-play and point to multipoint communication environment where the plurality of IoT devices, the plurality of IoT servers, and the plurality of IoT agents communicate with one another in a plug-and-play and in a point to multipoint manner regardless of their physical connections, industrial standards, and communication protocols; and the PnP&P2MP communication is managed by a deep reinforcement neural network (DRNN).

Another object of the present invention is to provide a method for achieving a plug-and-play point to multiple point communication between a plurality of IoT devices, a plurality of IoT agents, and a plurality of IoT servers regardless of their physical connections, industrial standards, and communication protocols; the method comprising:

(a) detect a physical connection for each of the plurality of IoT devices, a plurality of IoT agents, and a plurality of IoT servers;

(b) detect a communication protocol for each of the plurality of IoT devices, a plurality of IoT agents, and a plurality of IoT servers;

(c) establish a plug-and-play communication with the plurality of IoT devices, a plurality of IoT agents, and a plurality of IoT servers based on said physical connection, said industrial standards, and said communication protocols;

(d) determine whether each of the plurality of IoT devices, the plurality of IoT agents, and the plurality of IoT servers is incorporated in a control webapp, if the plurality of IoT devices, the plurality of IoT agents, and the plurality of IoT servers are included the control webapp, then (e) use the control webapp to create a point to multipoint communication and plug-and-play environment for the plurality of IoT devices, the plurality of IoT agents, and said plurality of IoT servers;

(f) if any of the plurality of IoT devices, the plurality of IoT agents, and the plurality of IoT servers is not included in the control webapp, detect their operating parameters, their communication protocols, and their industrial standards;

(g) create configuration files for each of the plurality of IoT devices, the plurality of IoT agents, and the plurality of IoT servers based on said said operating parameters, the communication protocols, and the industrial standards;

(h) embed the configuration files and load said said operating parameters, the communication protocols, and the industrial standards into said control webapp, and (i) perform the step of using the control webapp to create the point to multipoint manner and in the plug-and-play manner.

Yet another aspect of the present invention is to provide an IoT agent/server for managing an IoT environment all connected together and serviced by a network; the IoT environment (ecosystem) comprising pre-existing a plurality of IoT devices, pre-existing IoT agents, and pre-existing IoT servers. The IoT agent/server includes:

a configuration module configured to form and manage a control webapp;

a data handler module configured to manage and convert data and commands from the pre-existing IoT devices, a plurality of IoT agents, and a plurality of IoT servers;

an artificial intelligence and machine learning module configured to perform data analysis and predict operation behaviors of all IoT devices;

a device manager module to manage the plug-and-play and point to multipoint communications for all IoT devices by creating virtual nodes between said IoT agent and said plurality of IoT devices as soon as said plurality of IoT devices are first electrically coupled to and detected by said at least one IoT agents.

All the above aspects of the present invention achieve the following features and objectives:

An IoT environment that can achieve plug-and-play and point to multipoint communication for all IoT devices, IoT agents regardless of their industrial standards, physical connections, and communication protocols.

After connected to any pre-existing IoT environment, the IoT agent and IoT server of the present invention are capable of rendering such pre-existing IoT environment into a plug-and-play and point-to-multipoint communication IoT environment.

A plug-and-play and point-to-multipoint platform that can provide real-time data for all IoT devices connected thereto to increase the data analytics capability and artificial intelligence/machine learning to accurately predict the behaviors of users.

These and other advantages of the present invention will no doubt become obvious to those of ordinary skill in the art after having read the following detailed description of the exemplary embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the exemplary embodiments of the invention, examples of which are illustrated in the accompanying drawings. While the invention will be described in conjunction with the exemplary embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

As used herein, the term "action map" refers to which connections among IoT devices 111-1 to 120-N and 300-1 to 300-M to be selected.

Figure 1:
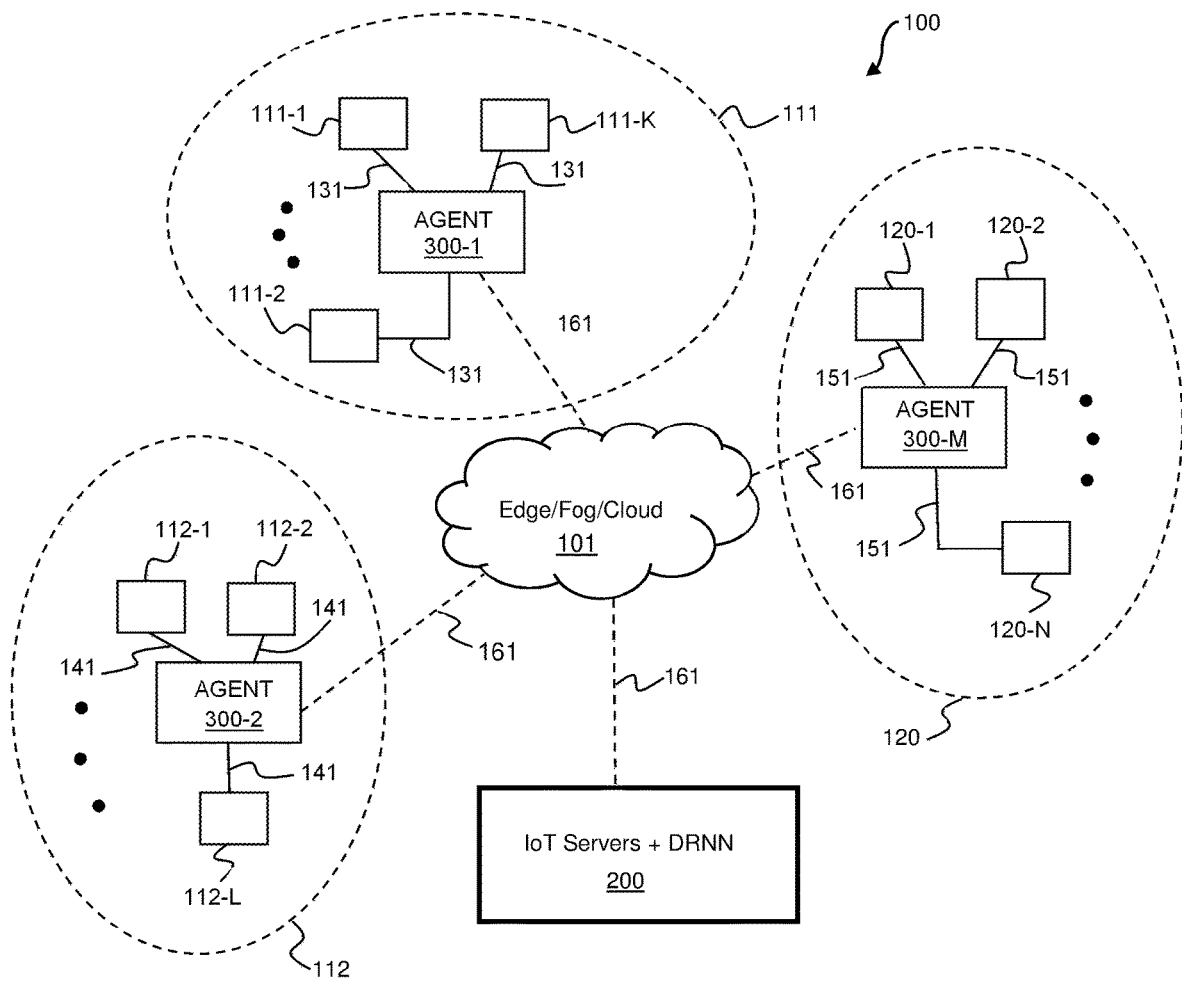
FIG. 1 is a schematic diagram of a Deep Reinforcement Neural Network (DRNN) configured to manage a plug-and-play (PnP) point to multipoint (P2MP) IoT environment including a network, IoT servers, IoT agents (agents), and different IoT devices in accordance with an exemplary embodiment of the present invention.

Various aspects of the present invention are now described with reference to FIG. 1-FIG. 8. FIG. 1 illustrates a schematic diagram of a deep reinforcement neural network (DRNN) based Internet of Things (IoT) 100 configured to manage a plug-and-play point to multipoint IoT environment including a network 101, IoT servers 200, IoT agents (gateways) 300-1 to 300-M, first IoT integration group 111, second IoT integration group 112, and an $M^{th}$ IoT integration group 120 of IoT devices in accordance with an exemplary embodiment of the present invention. First integration group 111 includes IoT devices 111-1, 111-2 . . . , 111-K connected to an IoT agent (agent) 300-1 via a first local communication channel 131. Second integration group 112 includes IoT devices 112-1, 112-2 . . . , 112-L connected to an IoT agent (agent) 300-2 via a second local communication channel 141. $M^{th}$ integration group 120 includes IoT devices 120-1, 120-2 . . . , 120-N connected to a third IoT agent (agent) 300-M via a third local communication channel 151. In some embodiments of the present invention, first to third local communication channels 131-151 can be different for different IoT devices manufactured by different manufacturers. In other embodiments, first to third local communication channels 131-151 can be the same. First to third local communication channels 131-151 can be either wireless channels such as Bluetooth, 4G, LTE, 5G, Wi-Fi, Zigbee, Z-wave, radio frequency (RF), Near Field Communication (NFC), or wired such as RS-232, RS-485, USB, or any combinations thereof.

Continuing with FIG. 1, as non-limiting examples, first integration group 111 can be a smart parking structure on a first location. Second integration group 112 can be another smart parking structure on a second location different from the first location. Yet, $M^{th}$ integration group 120 is another smart parking structure located on a third location different from the first location and the second location respectively. In another illustrating example, first integration group 111 can be a first smart city, second integration group 112 can be a second smart city, and third integration group 120 is a third smart city. Deep reinforcement neural network based IoT system 100 of the present invention is configured to manage the point to multiple point (P2MP) communications and operations of IoT devices 111-1 to 120-N in different integration groups 111-120. With such extensive P2MP communication between IoT devices 111-1 to 120-N and the complexities of the real world, the demands for bandwidth and power consumption can be prohibitive. DRNN-based IoT system 100 of the present invention executes a set of action $\{a_t\}$ according to a given policy $P_t$ including bandwidth, speed, power consumption, and/or efficiency (or network reliability). Policy $P_t$ is associated with a value Q-function which is an expected aggregate future rewards for the performances of IoT agents (supervisors) 300-1 to 300-M in a state Si can receive by executing action $\{a_t\}$. IoT server 200 and/or IoT agents 300-1 to 300-M are equipped with deep reinforcement algorithms that learn from previous actions $\{a_{t-1}\}$, measure the cumulative reward $R_t$, value Q function $Q_t$, and select the next action map $\{a_{t+1}\}$ to achieve optimal value function Q using policy-based approach including either deterministic policy gradient (DPG) or stochastic policy gradient (SPG). Cumulative reward $R_t$ includes network reliability (efficient aggregate power consumption of the whole system) and/or bandwidth, aggregate system power consumption. That is, DRNN-based IoT platform 100 increases the probability of actions $\{a_t\}$ that resulted in high cumulative reward $R_t$, optimal Q value function, and minimum loss function $\mathcal{J}$. In other words, DRNN-based IoT platform 100 is operative to select the probability of achieving actions $\{a_t\}$ that result in high cumulative reward $R_{ti}$ in the next iterative round. The detailed of the deep reinforcement algorithms will be described in FIG. 6 to FIG. 8.

Continuing with FIG. 1, in many aspects of the present invention, the agents of the DRNN-based IoT platform 100 is situated inside either IoT server 200 or IoT agents 300-1 to 300-M. In reinforcement learning, the location of agents are also important. For example, in autonomous self-driving cars, the RL agents must be located inside the car. In the present invention, the DRNN hardware is placed at IoT agents 300-1 to 300-M for selecting the actions $\{a_t\}$ of IoT devices 111-1 to 120-N. However, the DRNN algorithms to calculate cumulative reward function $R_t$, Q-value function Q(a, s), loss function $\mathcal{J}$ is placed inside IoT server 200. In other embodiments of the present invention, a broadband 5G or GTE base transmit station (BTS) is used with IoT agents (agents) 300-1 to 300-M. When either bandwidth and power consumption rewards are feedback in the observation, deep reinforcement neural network based (DRNN-based) IoT platform 100 use deterministic policy gradient (DPG) to put some of IoT devices 111-1 to 120-N in queue, storing their communication into a buffer memories, executing communication requests in batch, changing the state St, action $\{a_t\}$, cumulative reward $R_t$ in the direction of descending policy gradient until the bandwidths and power consumption requirements are met.

It will be noted that a group of m IoT devices of 111-1 to 120-N can be pre-existing, i.e., pre-connected to DRNN-based IoT platform 100 before the other newly connected (K+L+N−m) IoT devices. Alternatively, the (K+L+M−m) IoT devices can be newly connected as compared to previously connected m IoT devices. IoT devices that are connected to network 101 either before or after are made by different manufactures having different physical connections, communication protocols, industrial standards, as well as operating parameters from those in first integration group 111 of the present invention. IoT devices 111-1, 111-2, . . . , 111-K in first integration group 111; IoT devices 112-1, 112-2, . . . , 112-L in second integration group 112; and IoT devices 120-1, 120-2, . . . , 120-N in third integration group 120 can be devices connected to control the operations and receive real-time data from refrigerators, smart watches, garage openers, air conditioners, thermostats, cameras, faucets, sprinkler systems, mobile phones, sensors, wearable devices, etc. IoT agents (supervisors) 300-1, 300-2, and 300-M can be gateways, IoT agents, IoT interfaces, supervisors, etc. that are made by different manufacturers with different physical connections, communication protocols, and operating parameters and functionalities. These IoT devices have different operating parameters such as open/close, ON/OFF, temperatures, times, pressure, images, blood pressures, heart beats, bandwidth, power consumption, etc. Based on the known parameters, DRNN-based IoT platform 100 uses either stochastic policy gradient (SPG) or deterministic policy gradient (DPG) algorithm to select the next action map $\{a_t\}$ and state $S_t$. Network 101 can be data center, edge/fog/cloud, or network such as nanonetwork, body area network (BAN), personal area network (PAN), local area network (LAN), campus/corporate area network (CAN), metropolitan area network (MAN), wide area network (WAN), and mesh area networks, or any combinations thereof.

As shown in FIG. 1, regardless of the physical connections, manufactures, industrial standards, operating parameters, and communication protocols, and geographical locations, IoT agent (agents) 300-1 to 300-M and IoT servers 200 of the present invention are operable to achieve the following objects of the present invention:

(1) plug-and-play and point-to-multipoint communication for all IoT devices from 111-1 to 120-N represented by an action map $\{a_t\}$, and state $S_i$ that meets connectivity, parallel processing, power consumption, speed, and bandwidth requirements, thus reducing system latency, maximizing performance, and enhancing usability.

(2) Optimal management of the entire IoT environment using deep reinforcement neural network that has high probability of convergence and optimal performance; and (3) An IoT platform behaves like a blockchain in which IoT devices can freely exchange data needed for essential analytics.

The detailed hardware and software structures of IoT agents (agents) 300-1 to 300-M, IoT servers 200 with deep reinforcement neural network (DRNN) of the present invention will be described in details in FIG. 2 to FIG. 8.

Now referring to FIG. 2, a schematic diagram of a system of IoT servers 200 ("system 200") equipped with deep reinforcement neural network 250 (hereinafter referred to as "DRNN 250") in accordance with an exemplary embodiment of the present invention is illustrated. System 200 includes different IoT servers 210, 210-1, . . . , 210-P connected together via an edge/fog/cloud network 201. This means that system 200 is capable of connecting different IoT ecosystems similar to IoT platform 100 described in FIG. 1 via edge/fog/cloud network 201 to form a bigger IoT ecosystem. Each IoT platform has IoT server 210, 210-1 . . . 210-P that are communicating directly to one another via a link 203 or indirectly via edge/fog/cloud network 201 via wireless channels 202 depending on the geographical distance between these IoT platforms.

Figure 2:
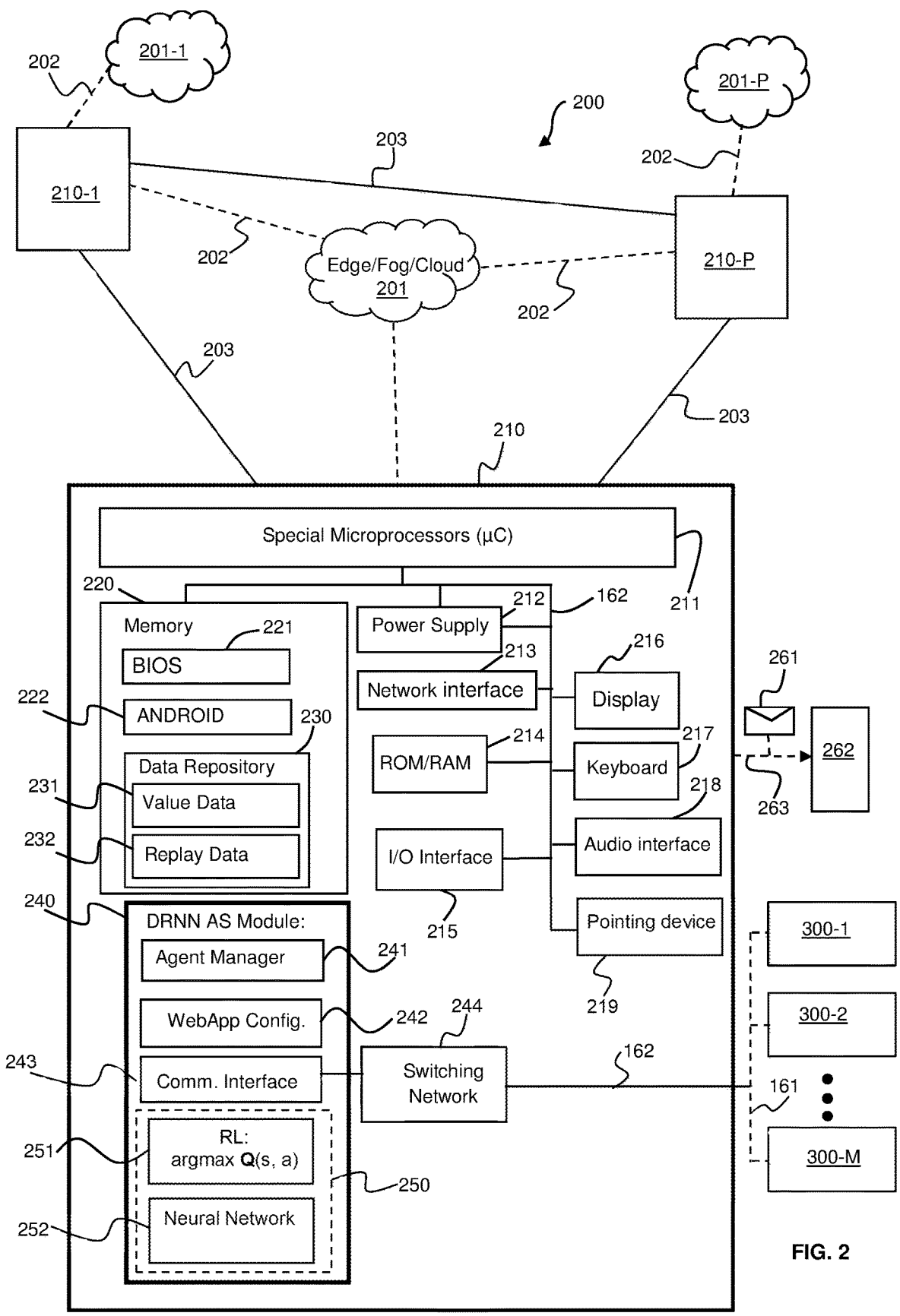
FIG. 2 is a schematic diagram of IoT servers including pre-existing IoT servers, a sub-network, and the inner structure of a plug-and-play IoT server of the pres in accordance with an exemplary embodiment of the present invention.

Continuing with FIG. 2, IoT server 210 (IoT server 210-1, . . . 210-P) includes a microprocessor 211 in communication with a memory 220 via a bus 162. System 200 also includes a power supply 212, a network interface 213, a Read Only Memory (ROM), Random Access Memory (RAM) 214, an input/output interface 215, a display 216, a keyboard 217, audio interface 218, and a pointing device driver 219. Power supply 212 provides necessary power supplies to all components of IoT server 210.

Memory 220 includes a basic Input/Output system (BIOS) 221, a data storage 222, a data repository 230 which includes value data storage 231 and replay data storage 232 for all IoT devices 111-1 to 120-N within IoT environment 100. More specifically, value data storage 231 is used to store different action map $\{a_t\}$, state data $S_i$, cumulative reward function $R_t$, value function Q(a, s), loss function $\mathcal{J}$, which will be shared with the target network in the freezing target network algorithm designed to reduce the complexities of the neural network (see FIG. 8) and to help the neural network converge. Replay data storage 232 is used in experience replay algorithm designed to help in the convergence of the neural network (see FIG. 8) by storing new data set in replay storage 232. Memory 220 stores Basic input/output system (BIOS) 221 for controlling low-level operation of IoT server 210. Memory 220 also stores an operating system (OS) 221 for controlling the operation of IoT manager 210. Data storage 222 illustrates example of computer-readable storage media as well as computer-readable instructions, data structures, program modules or other data for storage of virtual nodes and infrastructure of the entire IoT environment 100. It will be appreciated that operating system (OS) and Basic input/output system (BIOS) 221 may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Continuing with FIG. 2, IoT manager 210 further includes an DRNN application specific module 240 which further includes an agent manager module 241, a webapp configuration module 242, a communication interface module 243 connected to a switching network/router 244, and a deep reinforcement neural network (DRNN) 250. Gateway manager 242 is operative to (1) obtain and maintain the operating parameters of IoT agents 300-1 to 300-J; (2) implement the control webapp program (see FIG. 5); (3) determine the network topology of system 100 or system 200, i.e., whether they are connected in star, tree, or mesh configuration; (4) simulate the IoT environment; and (5) determine the location of agents 300-1 to 300-J. Actuator interface 243 is a firmware that takes the point to multipoint (P2MP) communication instructions from webapp configuration module 241 and gateway manager 242 and orders switching network 318 to perform this task. Switching network 318 is a hardware device comprised a plurality of transistor switches operative to connect IoT agents 300-1 to 300-J and IoT devices 111-1 to 120-N together in accordance with the instructions from webapp configuration module 241 and actuator interface 243. Webapp configuration module 241 is a software application that receives data information of the infrastructure of IoT environment 100, the virtual nodes representing the P2MP connections between IoT devices 111-1 to 120-N and their respective IoT gateways 300-1 to 300-J to create a graphic user interface (GUI) control webapp program that enables and controls the plug-and-playability and point-to-multipoint communication of the entire IoT environment 100. Webapp configuration module 241 is programmed using Java Script, C++, Python, PHP, Swift-Java, SQL, or HTML 5.

Still referring to FIG. 2, DRNN 250 further includes a reinforcement module (RL) 251 and a neural network 252. Device manager module 241 receives parameters such as bandwidth, speed, power consumption from each of IoT agent 300-1 to 300-M and IoT devices 111-1 to 120-N. In other words, device manager module 241 receives data information as well as device parameters from the infrastructure of IoT environment 100 or even larger system 200. Using the instructions such as action map $\{a_t\}$ and state $S_i$ of DRNN 250, device manager module 241 sets up virtual nodes representing the state $S_i$ of allowed communication connections between IoT devices 111-1 to 120-N and their respective IoT agents 300-1 to 300-M. A priority handler module 242 manages the priorities and interrupts of communication among IoT devices 111-1 to 120-N and IoT agents 300-1 to 300-M. The priorities and interrupts are based on the learning processes of neural network module 252 The state $S_i$, action map $\{a_t\}$, cumulative reward function $R_t$, value function Q(a, s), and loss function $\mathcal{J}$ determines the priorities and interrupts in case the peak hour communication among IoT devices 111-1 to 120-N are too large. Within the present invention, the cumulative reward $R_t$ is defined as $R_t = \Sigma_t{}^T \gamma^t r_t$; where is a discount factor and its value range is [0,1], and $r_t$ is defined as $$r(S_t, a_t) = \begin{cases} r_a & \text{if } \sum_i P_i \le P_{th} \\ -R_b, & \text{otherwise} \end{cases};$$

that is if the total power consumption for an action map $\{a_t\}$ selected by DRNN is within the threshold power consumption, then a positive reward Ra is given; otherwise a negative reward $R_b$ is given.

Device and system parameters including physical connections, communication protocols, industrial standards, bandwidth, power consumption, speed are fed to reinforcement learning (RL) module 451 so that the shortest path to the optimal value function $Q_{t+1}(a,s)$ can be chosen. The main function of RL module 451 is to maximize the value function Q(a,S). Value function is defined as $Q_{t+1}(S_t, a_t) = Q_t(S_t, a_t) + \alpha(R_{t+1} + \gamma \max(Q(S_{t+1}, a_{t+1}) - Q_t(S_t, a_t))$; where $\alpha$ is the learning rate and $\gamma$ is the discount rate. Loss function is defined as $\mathcal{J} = E[(r + \gamma \max_a Q(s', a') - Q(s, a))^2]$, where E is the expected value of the difference between the target value and the prediction value. A neural network module 252 performs the learning process that substantially reduces number of storage capacity to store the state data set and Q values stored of value data storage 231. Without neural network module 252, the trial and error interaction with the environment of RL module 251 is hard to be learned due to the formidable computation complexity.

Continuing with FIG. 2, a webapp configuration module 243 also receives the action map $\{a_t\}$ and state $S_i$ from DRNN 250 to set up the current communication state among IoT agents 300-1 to 300-M and IoT devices 111-1 to 120-N. Webapp configuration module 243 creates a graphic user interface (GUI) (See FIG. 6) that enables and controls the plug-and-playability and point-to-multipoint communication of the entire IoT environment 100. Data handler 242 receive data streams having different formats and data structure from different IoT devices 111-1 to 120-N and converts them into a format and structure that Webapp configuration module 242 and DRNN 250 can understand. In some embodiments of the present invention, webapp configuration module 242 is connected to 5G switching network/router 244 to adaptively connect IoT devices 111-1 to 120-N in point-to-multipoint communication. DRNN 245 predicts a set of actions $\{a_t\}$ for all IoT devices 111-1 to 120-N based on observations of bandwidth and power consumption including state changes $S_{i+1}$ and reward $R_t$. In many aspects of the present invention, DRNN 245 uses map of action $\{a_t\}$ to instructs Webapp configuration module 241 to to intelligently set up the control webapp to connect IoT devices 111-1 to 120-N according to a policy $P_t$ that optimizes the Q-function, Q(s,a).

It will be noted that system 200 can be connected as a cluster different IoT servers 210-1 to 210-P serviced by network 201. IoT server 210-1 and IoT server 210-P can be a pre-existing servers which are different from IoT server 210 of the present invention. More particularly, pre-existing (pre-connected) IoT server 210-1 and IoT server 210-P are connected to network 201 via a communication channel 202. IoT server 210 of the present invention is also connected to network 201 via communication channel 202. All IoT servers 210-1, 210, and 210-P can be connected together in a master-slave configuration via another communication channel 203. As alluded above, network 201 can be data center, cloud/edge/fog, or network such as nanonetwork, body area network (BAN), personal area network (PAN), local area network (LAN), campus/corporate area network (CAN), metropolitan area network (MAN), wide area network (WAN), and mesh area networks, or any combinations thereof. Communication channels 202 and 203 can be wireless channels such as Bluetooth, 4G, LTE, 5G, Wi-Fi, Zigbee, Z-wave, radio frequency (RF), Near Field Communication (NFC), Ethernet, LoRaWAN, or can be wired connectors such as RS-232, RS-485, USB, or any combinations thereof. IoT server of the present invention 210, pre-existing IoT servers 210-1 and 210-P can communicate to network 201 using different communication protocols such as Message Queue Telemetry Transport (MQTT), Data Distribution Service (DDS), HTTP, TCP/IP, (Advanced Message Queuing Protocol (AMQP), Modbus, BACnet, OPCUA, or any combinations thereof. It is also noted that pre-existing IoT servers 210-1 and 210-P are IoT servers that are connected to sub-networks (not shown) different from networks 201 either before or after IoT server 210 of the present invention. IoT servers 210-1 and 210-P and sub-networks may be made by different manufactures having different physical connections, communication protocols, industrial standards, as well as operating parameters from those of IoT server 210 of the present invention.

Continuing with FIG. 2, DRNN application specific module 240 may include computer executable instructions which, when executed by the control webapp to transmit, receive, and/or otherwise process messages (e.g., SMS, Multimedia Messaging Service (MMS) 261, Instant Message (IM), email, and/or other messages), audio, video, and enable telecommunication with users, at least one client mobile devices 262 via a communication channel 263. SMS message 261 can be a warning from any IoT devices 111-1 to 120-N that communicates to IoT server 210 in the point-to-multipoint communication according to the setup commands by the control webapp. In at least one of the various embodiments, DRNN application specific module 240, agent manager module 241, webapp configuration module 242, and DRNN 250 may be implemented as hardware devices such as tensor processing unit (TPU), graphic processing unit (GRU), application specific integrated circuit (ASIC), combinatorial logic circuits, field programmable gate array (FPGA), software applications, and/or the combination thereof. When DRNN 250 finds a set of actions $\{a_t\}$ that optimizes policy for both bandwidth and power consumption, the set of actions $\{a_t\}$ is mapped into webapp configuration module 243 in order to perform the set of actions $\{a_t\}$ via 5G switching network 244. Those communication requests that do not meet the policy are queued in priority handler 242 and then performed later by webapp configuration module 243 as the bandwidth and power consumption policy become available.

Figure 3:
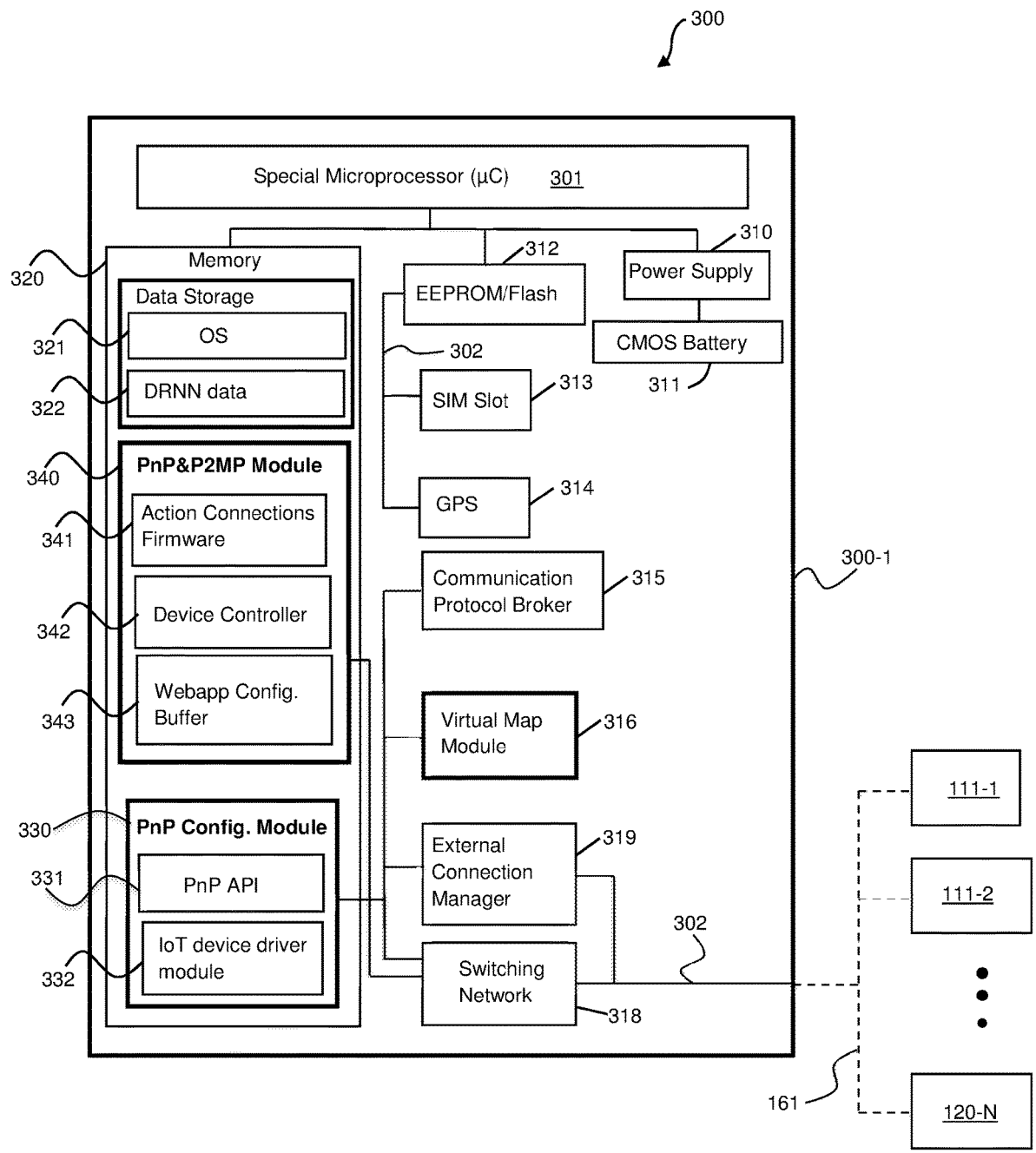
FIG. 3 is a schematic diagram of an IoT agents capable of point to multi-point communicating with IoT devices in a plug-and-play manner in accordance with an embodiment of the present invention.

Now referring to FIG. 3, a schematic diagram of an IoT agent (gateway) 300 configured to map the virtual nodes and infrastructure of IoT environment 100 in accordance to an exemplary embodiment of the present invention is illustrated. IoT server 210 and IoT agent 300 serve different functions at different levels. At the first level, IoT server 210 contains DRNN application specific module 240 that uses webapp configuration module 241 to receive action $\{a_t\}$ from DRNN 250 and to create the control webapp in form of graphic user interface (GUI) designed to control the plug-and-play (PnP) and point to multipoint (P2MP) communication of IoT environment 100. At a second level, IoT agent (agent) 300 is configured to perform two main functions. First, IoT agent (agent) 300 is designated as an agent that takes the action map $\{a_t\}$ from DRNN 250 and execute actions amp {a_t}. Second, IoT agent (agent) 300 also includes modules and utilities configured to retrieve information regarding physical connections, industrial standards, manufacturers, communication protocols, virtual nodes, and infrastructure of the entire IoT environment 100 including IoT servers 210, pre-existing IoT servers 210-1 and 210-P in communication with a memory 320 via a bus 312. IoT server 300 also includes a power supply 310, a Complementary Metal Oxide Semiconductor (CMOS) supply 310, an Electrically Erasable Programming Memory (EEPROM)/Flash memory 312, a SIM slot 313, an Geo Positioning Satellite (GPS) 314, an external connection port 315, a multiple communication ports 316, a detector 317, a 5G switching network/router 318, and a communication protocol port 319. Power supply 310 provides necessary power supplies to IoT agent 300. CMOS battery 311 is designed to provide voltage supply to IoT agent 300 when power supply 310 fails.

Continuing with FIG. 3, IoT agent 300 also includes a memory 320 and a plug and play point to multipoint mapping module (PnP&P2MP) 340. Memory 320 includes an operating system (OS) 321, a data storage 330. OS 321 controls the operations of IoT local. Data storage 330 includes local real-time data storage 331 for storing real-time current communication data for those IoT devices 111-1 to 120-N that are in P2MP communication according to action map $\{a_t\}$. Priority data storage 332 stores those IoT devices in queue waiting for future action map $\{a_{t+1}\}$. Data storage 330 illustrates example of computer-readable storage media as well as computer-readable instructions, data structures, program modules or other data for storage of virtual nodes and infrastructure of the entire IoT agent 300. It will be appreciated that operating system (OS) 321 may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Continuing with FIG. 3, IoT agent 300 further includes a PnP&P2MP module 340 which further includes an action connection firmware 341, a device controller 342, a communication protocol module 343, an PnP module 330, a virtual map module 316, and a communication protocol module 319. An external connection manager 319 is a hardware and software device designed to detect the current physical connections of IoT agents 300-1 to 300-P and IoT devices 111-1 to 120-N. The physical connections such as wireless channels such as Bluetooth, 4G, LTE, 5G, Wi-Fi, Zigbee, Z-wave, radio frequency (RF), Near Field Communication (NFC), Ethernet, LoRaWAN, or wired such as RS-232, RS-485, USB, or any combinations thereof. In some embodiments of the present invention, communication protocol broker 319 scans and detect the frequency of each IoT device 111-1 to 120-N, and then action connection firmware 341 executes the physical connections set by action map $\{a_t\}$. In other embodiments, communication protocol module 319 is a scanner that scans the RFID, QR, barcodes, other codes that manufacturers printed on each IoT device 111-1 to 120-N. These codes will specify physical connections, communication protocols, types, and manufactures of each IoT devices 111-1 to 120-N and IoT agents 300-1 to 300-M, and IoT servers 210-1 to 210-P. Similarly, in accordance with many embodiments of the present invention, a communication protocol broker 315 is a hardware and software tool designed to detect the communication protocols of each IoT devices 111-1 to 120-N and IoT agents 300-1 to 300-M, and IoT servers 210-1 to 210-N. As alluded above, different communication protocols includes, but not limited to, Message Queue Telemetry Transport (MQTT), Data Distribution Service (DDS), HTTP, TCP/IP, (Advanced Message Queuing Protocol (AMQP), Modbus, BACnet, OPCUA, IEEE standards, or any combinations thereof.

Still referring to FIG. 3, after the physical connections and communication of IoT devices 111-1 to 120-N are determined, PnP module 330 and virtual map module 316 are sent to each integration 111, 112, and 120 in order to map out the entire virtual nodes and infrastructure of IoT environment 100. Virtual nodes are connection nodes between each IoT agent and IoT devices 111-1 to 120-N. From the information about virtual nodes and other information such as physical connections, communication protocols, and manufacturers, virtual map module 316 maps out the infrastructure of IoT environment 100 similar to FIG. 1 representing state $S_i$. Virtual nodes and infrastructure will be sent to IoT server 210 so that webapp configuration module 242 can create the GUI control webpage for each user. An external connection manager 319 receives action connection firmware module 341 to perform the action map $\{a_t\}$ output by DRNN 260.

The control webapp (see FIG. 6) controls device controller 342 to control the operations of each IoT devices 111-1 to 120-N. A switching network/router 318 is operable to perform point to multipoint communication for IoT servers 200, IoT agents 300-1 to 300-M, and IoT devices 111-1 to 120-N. In some exemplary embodiments of the present invention, switching network/router 318, device controller module 342, and PnP module 344 can be either hardware or software engines or combinations thereof that are situated universally on network 101 or locally on each IoT agents 300-1 to 300-M. As mentioned before, in case where IoT devices 111-1 to 120-N can be located in different geographical locations from IoT devices 112-1 to 112-N and IoT devices 120-1 to 120-N, the physical detection of communication channels using hardware transceivers and antennas are not feasible. Thus, software devices such as device controller module 342, PnP module 344 of the present invention installed locally on each IoT agents 300-1 and 300-M or universally on network 101 are necessary to control the communication of IoT servers 200, IoT agents 300-1 to 300-M, and IoT devices 111-1 to 120-N.

Figure 4:
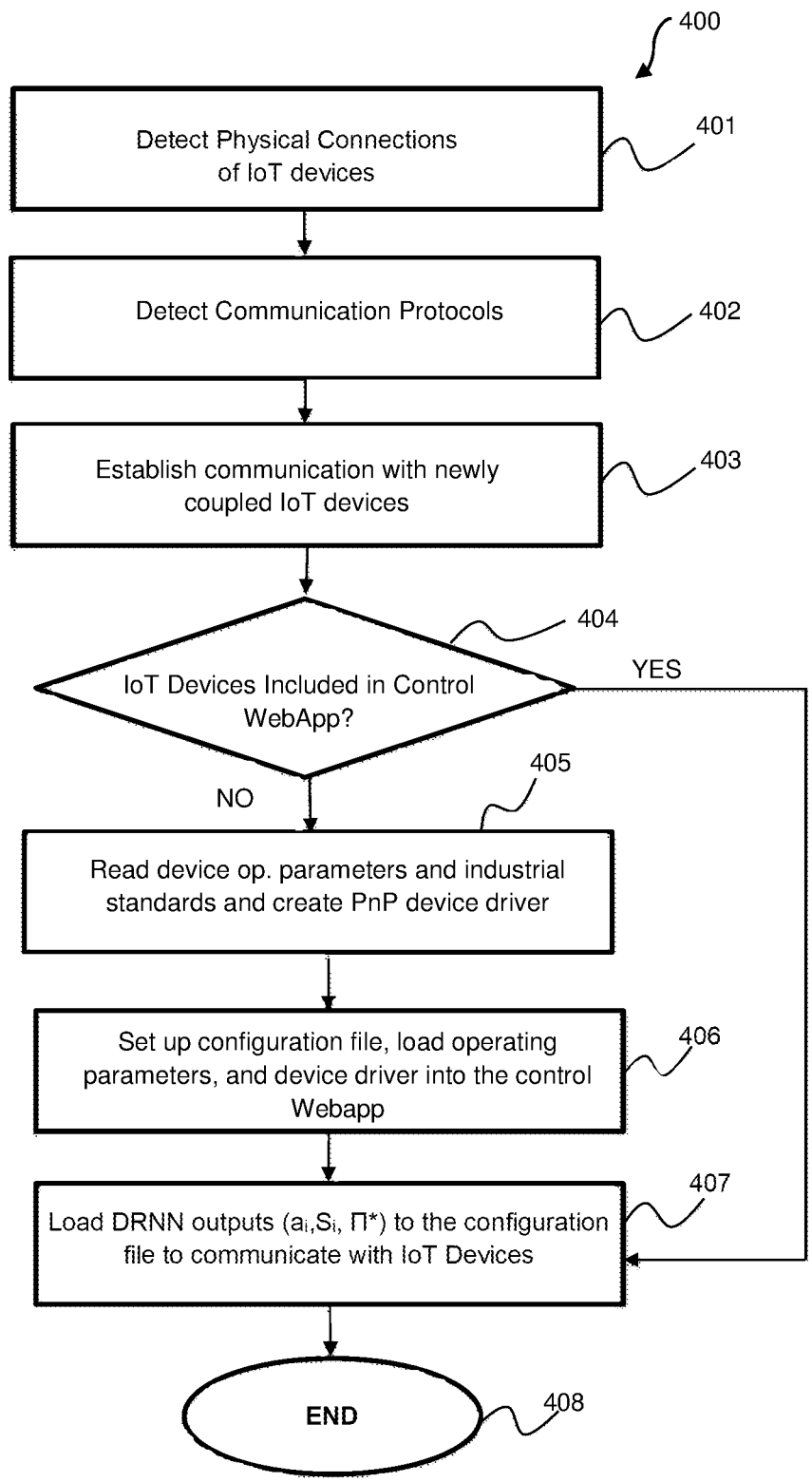
FIG. 4 is a flow chart illustrating a process of providing a plug-and-play point-to multipoint communication for various IoT devices in a IoT environment in accordance with an exemplary embodiment of the present invention.

Now referring to FIG. 4, a flowchart 400 illustrating a process of generating and managing a a plug-and-play and point and multipoint communication for IoT devices 111-1 to 120-N in IoT environment 100 in accordance with an exemplary embodiment of the present invention is illustrated. In various aspects of the present invention, method 400 is implemented to enable any pre-existing IoT servers, any pre-existing IoT agents or hubs or gateways, and any pre-existing IoT devices to become plug-and-play and point to multipoint communication when connected to network 101 with IoT server 210 and IoT agent 300 of the present invention. In other words, within the scope of the present invention, when IoT agents 300 and IoT server 210 are connected to network 101 with pre-existing IoT agents 300-2 and 300-N and IoT servers 210-1 and 210-N, IoT agent 300 and IoT server 210 use PnP&P2MP module 340 to retrieve information regarding physical connections, communication protocols, manufacturers, operating parameters to create virtual nodes and infrastructure of the entire IoT environment 100. Then, DRNN application specific module 240 loads the information containing action map $\{a_t\}$ into a template software configuration to create the control webapp using PnP&P2MP configuration module 340. Finally, the control webapp will control and manage the plug-and-play and point to multipoint communication for IoT environment 100. The following steps of method 400 of the present invention disclose the features of the present invention.

At step 401, the physical connections and the existence of IoT devices, IoT agents, IoT servers are detected as soon as the IoT agent and IoT server of the present invention are connected in each of integration groups 111, 112, or 120. In implementing step 401, communication protocol module 319, action connection firmware 341, and PnP API 331 are used. In some embodiments, external connection module 319 is a scanner that scan barcodes, RFID, QR codes, and any other codes that contain physical connections of each IoT device 111-1 to 120-N. In many embodiments of the present invention, PnP API 331 and action connection firmware 341 are sent into IoT environment 100 in order to detect the current physical connections. Physical connections within the scope of the present invention include wireless short range communication channels include Zig-Bee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc.. Medium range wireless communication channels in this embodiment of communication link 161 include Wi-fi and Hotspot. Long range wireless communication channels include UHF/VHF radio frequencies. Wired connections include RS-232 and RS-485.

Next is step 402, the communication protocols of each device within the IoT environment is detected. In many aspects of the present invention, step 402 is implemented using external connection manager 319. Within the scope of the present invention, communication protocols include Message Queue Telemetry Transport (MQTT), Data Distribution Service (DDS), Web/HTTP-HTML, TCP/IP-Internet, e-mail/IP-Internet, (Advanced Message Queuing Protocol (AMQP), Modbus, BACnet, OPCUA, Wireless Application Protocol (WAP), or any combinations thereof. Once communication protocols are detected, the sets of hardware/software rules that enables end-points communication between IoT servers 200, IoT agents 300-1 to 300-M, and IoT devices 111-1 to 120-N are known.

At step 403, once physical connections and communication protocols are known, communication within the IoT environment are established. In various implementations of step 403, device controller 342 and webapp configuration module 343 map out virtual nodes and the entire infrastructure of IoT environment 100. Agent manager module 241 temporarily installed in EEPROM/Flash 312 of IoT agent 300 will receive and convert any commands in accordance to the communication protocols of each IoT device 111-1 to 120-N. Switching network/routers 318 is implemented as hardware that plays an important roles in the realization of step 403. Step 403 achieves plug-and-play between IoT agents 300-1 to 300-M, IoT devices 111-1 to 120-N, and servers 210, 210-1 to 210-P.

At step 404, whether each IoT device, IoT agent, and IoT server represented by a virtual node and infrastructure are incorporated into the control webapp is determined. Step 404 is implemented by device controller 342 and agent manager 241. In many aspects of the present invention, device controller 342 and agent manager 241 go into webapp configuration module 243 to check if newly found virtual nodes and infrastructure have been embedded in the control webapp in form of software buttons and device engines designed to control the plug-and-play and point to multipoint communication for each virtual node and each infrastructure.

At step 405, if the answer to step 404 is NO, operating parameters, industrial standards, physical connections, communication protocols of each IoT device, IoT agent, IoT server are read and embedded into each virtual node. Consequently, each virtual node representing an IoT device is provided with an ID. In many aspects of the present invention, step 405 is implemented by PnP API 331 including many device engines that enter each IoT device 111-1 to 120-N, each IoT agent 300-1 to 300-M, and IoT server 210-1, 210-2, and 210 to retrieve these information. In some other aspects of the present invention, external connection manager 319 can be used to scan in the barcodes, QR codes, optical codes, RFID codes, and other codes that contain the above information.

Next, at step 406, the above information is incorporated into a configuration file. In some aspects of the present invention, configuration file is created and maintained by webapp configuration module 243 in form of a software GUI template. Information regarding physical connections, communication protocols, operating parameters, manufacturers, virtual nodes, and infrastructure are filled in entries of the software template. Please refer to FIG. 6.

At step 407, action map $\{a_t\}$ that satisfied $$\underset{a_t}{\mathrm{argmax}} Q(s, a, \pi)$$

condition is loaded into the configuration module to established P2MP communication in the Internet of Things environment. Step 407 is realized by action connections firmware 341 configured to take information from action map $\{a_t\}$ to connect webapp configuration module 243. Webapp configuration module 242 uses action map $\{a_t\}$ and the configuration file to create the GUI control webapp of FIG. 6. The control webapp is an active GUI software program that contains many device engines, plug and play API that are controlled by communication interface 243 and device controller 342.

At step 408, plug-and-play and point to multipoint communication of the IoT environment is controlled by the control webpage. In many aspects of the present invention, when a user registers to use the services provided by the control webapp, the user first logs in and sets the operations of IoT environment 100. Once the plug-and-play and point to multipoint communication is set, the control webapp sends out instructions to virtual nodes, device controller 342 and agent manager 241 to perform the tasks set by the user. Referring back to step 408, when a newly connected IoT is connected to a pre-existing (pre-connected or pre-linked) IoT environment and it is determined that this newly connected IoT device is already incorporated in the control webapp, step 408 is performed.

In summary the following objects of the present invention are achieved by process 400 of the present invention:

Point to multipoint (P2MP) communication in the Internet of Things environment shown in FIG. 1 is automatically established and performed in the direction that meets bandwidth and power consumption constraints without substantial latency and network instability.

An IoT environment that can achieve plug-and-play and point to multipoint communication for all IoT devices, IoT agents regardless of their industrial standards, physical connections, and communication protocols.

After connected to any pre-existing IoT environment, the IoT agent and IoT server of the present invention are capable of rendering such pre-existing IoT environment into a plug-and-play and point-to-multipoint communication IoT environment.

A plug-and-play and point-to-multipoint platform that can provide real-time data for all IoT devices connected thereto to increase the data analytics capability and artificial intelligence/machine learning to accurately predict the behaviors of users.

Figure 5:
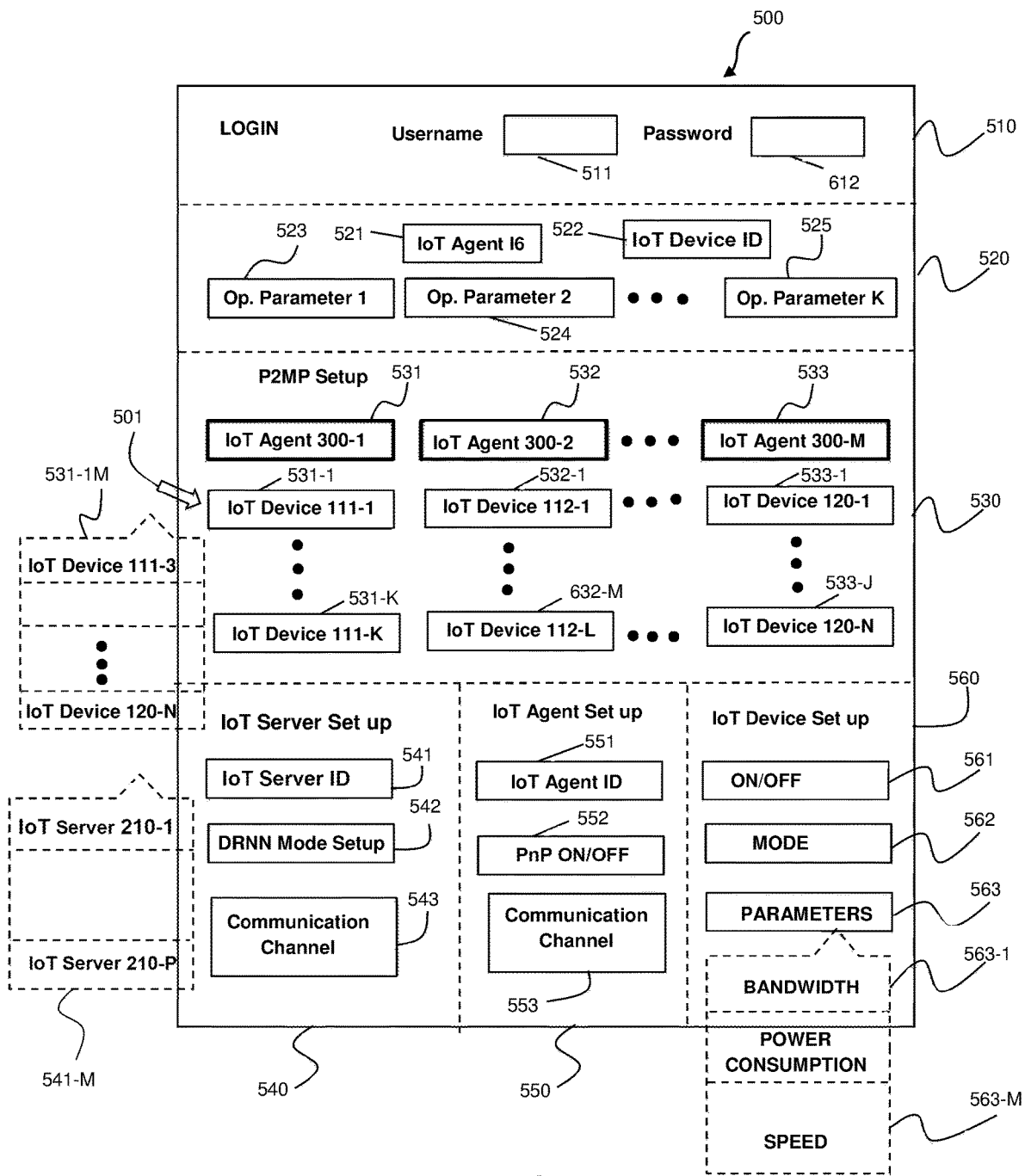
FIG. 5 is a flow chart illustrating a method of setting up a point to multipoint communication between IoT devices, IoT agents, and IoT servers within an IoT environment using a control webapp in accordance with an exemplary embodiment of the present invention.

Referring now to FIG. 5, a perspective view of a control webapp 500 configured to set up and manage the plug-and-play and point to multipoint communication between IoT agents 300-1 to 300-M, IoT servers 200, and IoT devices 111-1 to 120-N in accordance with an exemplary embodiment of the present invention is illustrated. In many embodiments of the present invention, control webapp 600 is created by webapp configuration module 242 which receives virtual nodes, infrastructure, physical connections, communication protocols, industrial standards, and operating parameters information from action connection firmware 341, external connection manager 319, and PnP API module 330. In various embodiments of the present invention, control webapp 600 visually reflects the current action map $\{a_t\}$ and state Si of DRNN 240. From this, other functions such as value function Q(a,s), policy function $P_t$, and loss function $\mathcal{J}$ are performed by RL module 451. Deep learning module 252 uses the policy gradient based approach to achieve the optimal value function Q with which action map $\{a_t\}$ and state $S_t$ are loaded to control webapp 600 so that users can see.

In one particular embodiment of the present invention, control webapp 500 is displayed as a webapp on a computer screen of a user with a pointing device 501. In other embodiments of the present invention, control webapp 500 can be displayed on a touchscreen of a mobile phone and pointing device 501 is a finger of a user.

Continuing with FIG. 5, in an exemplary embodiments of the present invention, control webapp 500 includes a login section 510, a IoT device reading section 520, a point to multipoint setup section 530, an IoT server setup section 540, a IoT agent setup section 550, and an IoT device setup section 560. Login section 510 further includes a username window (or box) 511 and a password window (box) 512 for a user to perform a two step authentication process. Other methods of authentication such as scanning in barcodes, QR codes, RFID, or sending an authentication code to a registered email are also within the scope of the present invention.

IoT device reading section 520 includes an IoT agent box 521, IoT device 522. Below are all current operating parameter boxes such as operating parameter 1 523, operating parameter 2 524, and operating parameter K 525. A non-limiting example of IoT device reading section 520 is the display of the IoT device 522 as an air conditioner (AC) having first operating parameter 1 523 as real-time temperature (° C.), operating parameter 2 524 as time interval when the AC is turned on. For example, the user can set the AC to be turned on for 8 hours a day. Operating parameter K 525 is the speed of the AC. IoT agent box 521 is the hub or gateway where the AC is directly connected to. It is noted that the user can add or remove the operating parameters 523-525. For example, the user can add in the angle and/or the direction of the fan of the AC as other operating parameters. The connection between each IoT device 111-1 to 120-N and its IoT agents 300-1 to 300-M forms a virtual node which includes all the operating parameters 523 to 525. Beside IoT box 521 and IoT device ID box 522 are PnP API 331, IoT device configuration module 345 and and their corresponding device engines that enter each IoT device 111-1 to 120-N to retrieve the necessary information such as operating parameters, communication protocols, physical connections, etc. so that webapp configuration module 242 can build control webapp 500 and IoT device reading section 520.

Continuing with FIG. 5, P2MP setup section 530 includes a matrix of IoT agents and IoT devices. Particularly, in the first column, IoT agent 300-1 is shown in box 531. Box 531-1 represents IoT device 111-1, box 531-2 represents IoT device 111-2, . . . , box 531-K represents IoT device 111-K respectively. Similarly, in the second column, IoT agent 300-2 is shown in box 532 which includes IoT device 112-1 in box 532-1, IoT device 112-2 in box 532-2, . . . and IoT device 112-L box 532-L respectively. In the last column, IoT agent 300-M is shown in box 533 which includes—from top to bottom—IoT device 120-1 in box 533-1, IoT device 120-2 in box 533-2, . . . and IoT device 112-N in box 532-N. Referring again to FIG. 1, this map is achieved by virtues of PnP API 331 communication protocol module 319 and and their corresponding device engines. In one exemplary embodiment of the present invention, when a user sets up the point to multipoint communication between these IoT devices 111-1 to 120-N, the user can move pointing device 501 to any of the above listed boxes, a dropdown menu 531-M will appear. The user only needs to click on any IoT devices, namely, 111-2 to 120-N in order to connect them to IoT device 111-1. Consequently, to DRNN 250, this modification actions by users are a random process. In addition, new connections by new IoT devices, IoT agents, or even IoT servers are random. As such, DRNN 250 updates new action map $a_t$, state $S_t$, value function Q(a,s), policy function $P_t$, and loss function $\mathcal{J}$ since the previous state and action map $\{a_t\}$ are no longer optimal.

Still referring to FIG. 5, in IoT server setup section 540, an IoT server ID box 541 lists all IoT servers 120-1, 120-2, and 120 that are currently active. When the user moves pointing device 501 to IoT serve ID box 541, a dropdown menu 541-M informs the user all IoT servers that are active and detected by PnP API 331 webapp configuration module 3453 and and their corresponding device engines. Next, an artificial intelligence/machine learning box 541 can be turned on or off. When box 541 is turned on, AI/ML module 245 will perform data analytics and automatically set up point to multipoint communication for the user. The results will be displayed in P2MP setup section 530. A communication channel box 543 displays the physical connections and communication protocols of the currently displayed IoT server in box 541. It will be noted that other information such as manufacturers, IoT server ID can also be displayed in box 540.

Continuing with FIG. 5, in IoT agent setup section 550, an IoT agent ID box 551 lists all IoT agent 300-1 to 300-M that are currently active. When the user moves pointing device 501 to IoT agent ID box 551, a dropdown menu (not shown) informs the user all IoT agents that are active and detected by PnP API 331 configuration module 343 and and their corresponding device engines. Next, a plug-and-play box 551 can be turned on or off. When box 552 is turned on, PnP API 331 causes all IoT devices 111-1 to 120-N to be in plug-and-play mode. A communication channel box 553 displays the physical connections and communication protocols of the currently displayed IoT agent in box 551. It will be noted that other information such as manufacturers, IoT agent ID can also be displayed in box 550.

In IoT device setup section 560, a ON/OFF box 561 allows the user to turn on or off the modification for each IoT device 111-1 to 120-N. If box 561 is turned on, it allows the user to either add or remove operating parameters in an add/remove box 562. If the user changes operating parameters of an IoT device, IoT device reading section 520 will change accordingly. Finally, a mode box 563 sets either real-time mode or interval mode for each IoT device 111-1 to 120-N. When the user moves pointing device to mode box 563, a dropdown menu 563-M listing all the modes of each IoT device will appear to allow the user to select the mode of data transmission. As a non-limiting example, when the user wants IoT device 120-1 to transmit data in the real-time mode, the user shall do to the IoT device reading section 520 to change IoT device ID box 522 to display IoT device 120-1 and IoT agent ID box 521 to IoT manger 300-M. Then the user moves pointing device 501 to mode box 563 to select the real-time mode. As a result, IoT device 120-1 starts to send data to be displayed in IoT device reading section 520 in real-time manner.

Figure 6:
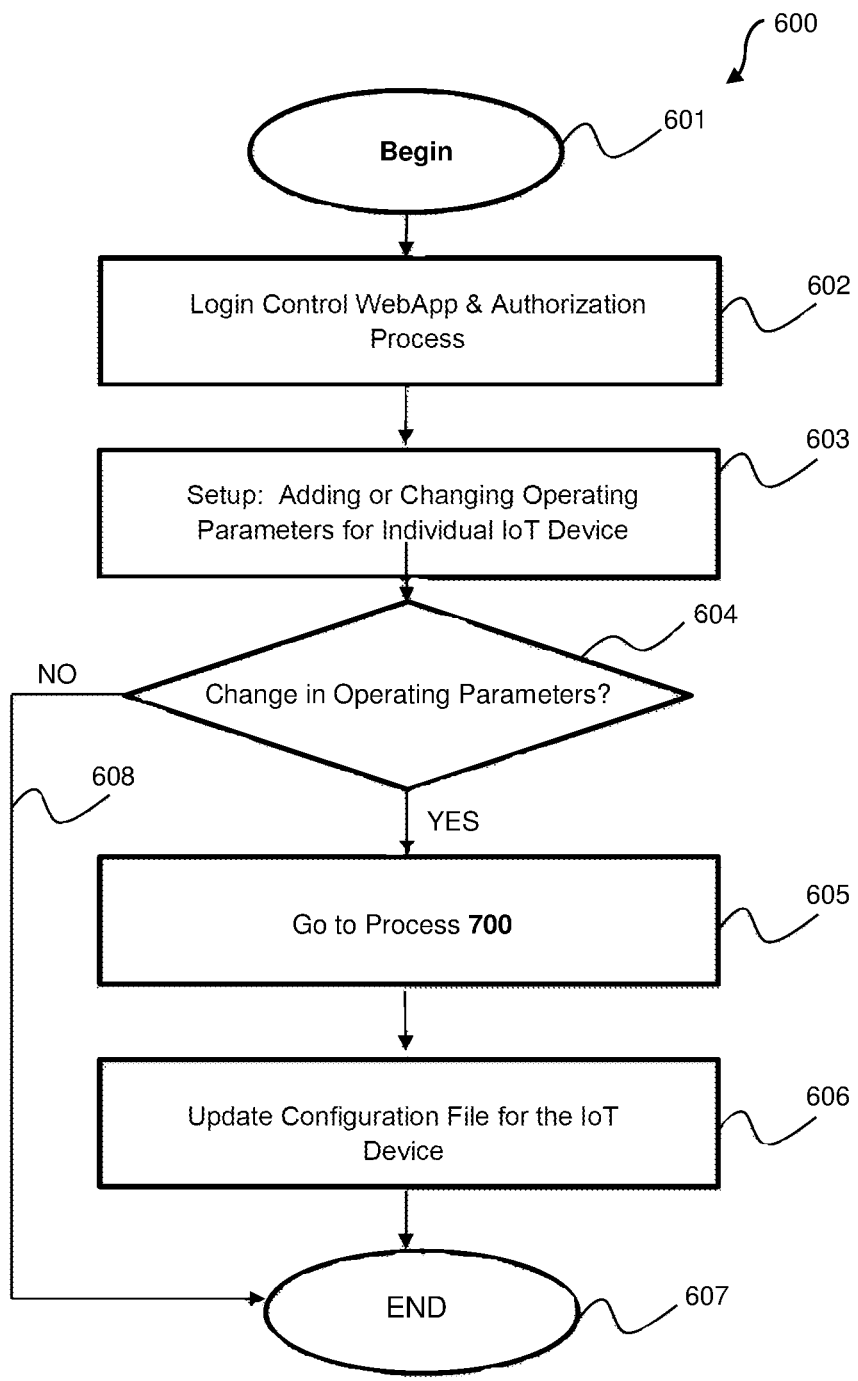
FIG. 6 is a perspective view of a webapp configured to provide plug-and-play and point to multipoint communication for an IoT environment in accordance with an exemplary embodiment of the present invention.

Next, referring to FIG. 6, a flow chart illustrating a method 500 of setting up and managing a point to multipoint communication between IoT devices, IoT agents, and IoT servers within an IoT environment using a control webapp in accordance with an exemplary embodiment of the present invention is illustrated.

At step 601, a control webapp is activated and displayed. In accordance with many embodiments of the present invention, the control webapp is an interactive tool that directly controls the plug-and-play and point to multipoint communication between IoT devices 111-1 to 120-M in a manner described above in FIG. 2 to FIG. 3. Step 601 is implemented by a control webapp 500. The detailed description of control webapp 500 is described above in FIG. 5.

At step 602, a subscribed user signs in and carries out the authorization process. Step 602 is implemented by a log-in section 510 of control webapp 500. In various aspects of the present invention, other authentication method such as RFID, biometrics, or random codes can be used.

At step 603, operating parameters for each IoT device are modified. Step 603 is implemented by IoT device reading section 520 and IoT device setup section 560.

At step 604, whether operating parameters of IoT devices, IoT agents, and/or IoT servers are modified by users. If the answer is YES, then at step 605, the DRNN algorithm 700 is performed. That is, a new action map $\{a_{t+1}\}$ is proposed, a cumulative reward function $R_t$, $$\operatorname*{argmax}_{a_t} Q(s, a, \pi))$$

are recalculated to determine whether the bandwidth, speed, and power consumption are met.

At step 606, configuration file is updated. The configuration file is updated based on the changes that user selects in step 602 to 604. Step 605 is implemented by webapp configuration module 241, DRNN 245, configuration module 345, IoT device controller module 342, and PnP API 344.

At step 607 and step 608, if there are no change in the operating parameters, action map $\{a_t\}$, then P2MP communication among IoT devices continues. Consequently, there is no change in stage s of previous action map $\{a_t\}$.

Figure 7:
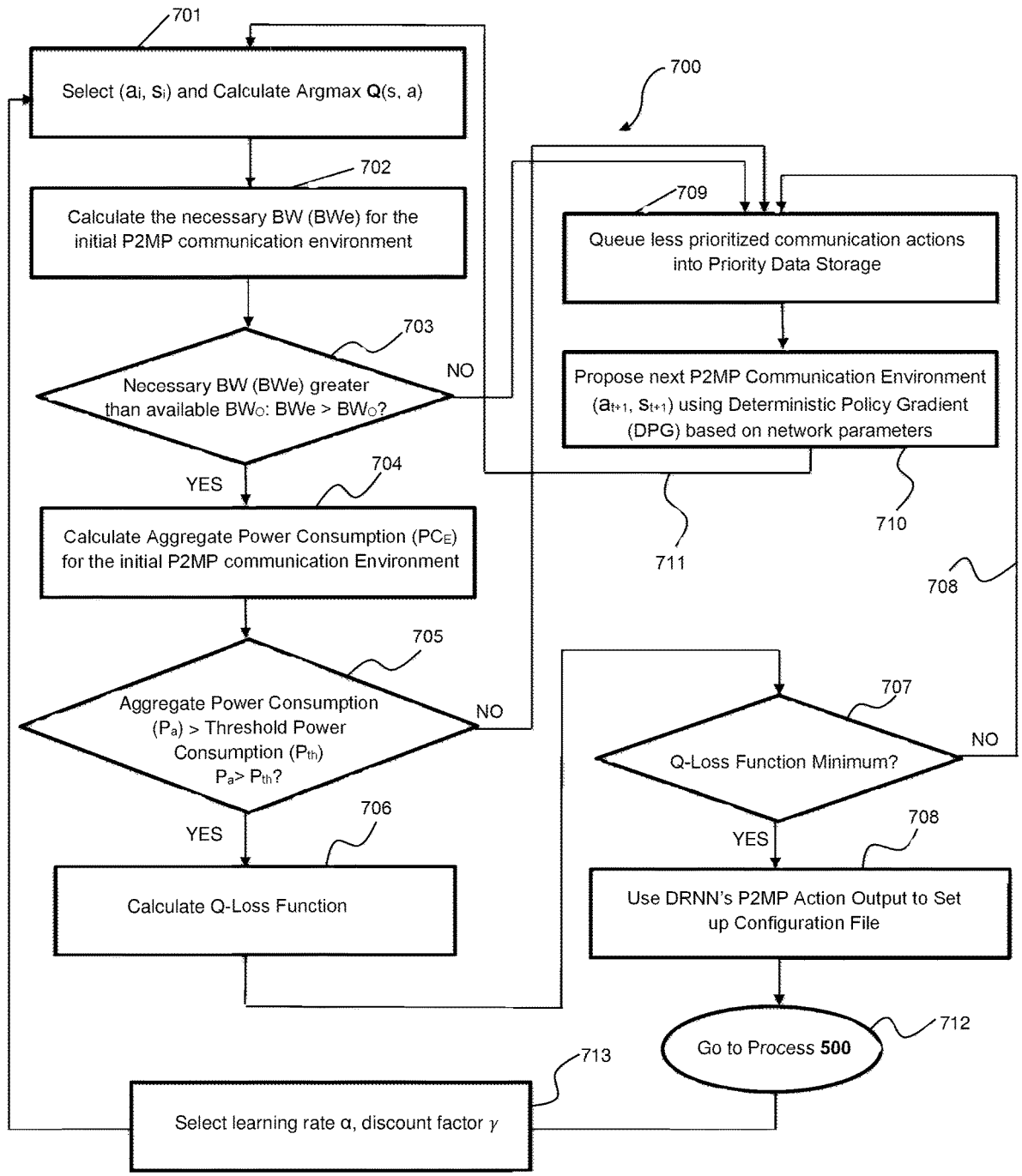
FIG. 7 is a flow chart illustrating an deep reinforcement algorithm based on policy gradient of bandwidth and power consumption in accordance with an exemplary embodiment of the present invention is illustrated.

FIG. 7 is a flow chart illustrating a deep reinforcement algorithm 700 based on policy gradient of bandwidth, speed, and power consumption in accordance with an exemplary embodiment of the present invention is illustrated.

At step 701, a first action map $\{a_t\}$ is proposed and then its $$\operatorname*{argmax}_{a_t} Q(s, a, \pi)$$

is observed. In various aspects of the present invention, Q(s, a) is a value equation defined as as $Q(s,a)=E[\gamma r_t|s, a, \pi]$. E is the expected value of the cumulative reward function $R_t$, and $\gamma$ is the discount value. The cumulative reward function $R_t$ is defined based on sum of total bandwidth that converges to a network bandwidth ($BW_o$) and total power consumption that converges to a preset power consumption ($P_{th}$). If an action map $\{a_t\}$ yields an aggregate system power consumption and bandwidth that are less the the network bandwidth ($BW_0$) and a preset power consumption ($P_{th}$), then a reward function $r_t$ is Ra. Otherwise, the reward is −Rb. The network bandwidth ($BW_0$) inherently depends on the network layer of IoT platform 100 and how it is set up. Within the present invention, the cumulative reward $R_t$ is defined as $R_t = \Sigma_t^T \gamma r_t$; where is a discount factor and its value range is [0,1], and $r_t$ is defined as $$r(S_t, a_t) = \begin{cases} r_a \text{ if } \sum_i P_i \le P_{th} \\ -R_b, \text{ otherwise} \end{cases};$$

that is if the total power consumption for an action map $\{a_t\}$ selected by DRNN is within the threshold power consumption, then a positive reward $R_a$ is given; otherwise a negative reward $R_b$ is given.

At step 702, the total bandwidth of the first action map $\{a_t\}$ is calculated. Step 702 is realized by using an arithmetic logic unit (ALU) in GRU 301 to sum up all the communication bandwidth amongst IoT devices 111-1 to 120-N. For example, if IoT device 111-1 is P2MP communicating with 5 other IoT devices, e.g., 120-1, 120-2, 112-1, 112-1, 111-K. This P2MP communication is an action map $\{a_t\}$. The total communication bandwidth utilization $BW_c$ can be observed and obtained. DRNN 450 uses these initial problems and constraints to randomly select an action map $\{a_t\}$ and state $S_t$.

At step 703, the total communication bandwidth is compared with an available network bandwidth ($BW_o$). In each communication system, there exists an inherent communication bandwidth ($BW_o$) defined by the network configuration of IoT platform 101 and the upper and lower communication frequencies of each IoT devices. For example, if IoT platform 100 is connected in LoRaWAN configuration, the data rate is 500 kHz depending on the region and frequency plan. If network 101 is Cloud/Fog/Edge network, then the bandwidth ($BW_o$) depends on the location.

At step 704, if $BW_o$ is less than the communication bandwidth utilization ($BW_c$) then the total power consumption ($P_e$) is calculated. Both steps 703 and 704 are realized by communication protocol module 319, device controller 342, agent manager 241. They sum all the power requirement by each IoT device 111-1 to 120-N together.

At step 705, whether the total power consumption ($P_e$) is greater than a threshold power consumption ($P_{th}$) is determined. Step 705 is realized by using an arithmetic logic unit (ALU) in GRU 301 to sum up all the power consumption amongst IoT devices 111-1 to 120-N. For example, if IoT device 111-1 is P2MP communicating with 5 other IoT devices, e.g., 120-1, 120-2, 112-1, 112-1, 111-K. This P2MP communication is action map $\{a_t\}$. The total power consumption $P_e$ by these 5 IoT devices can be observed and obtained.

At step 706, Q-loss function is calculated. Q-loss function is defined as the root means square of the difference between the target cumulative reward function $R_t^*$ and the estimated $R_t$. $R_t$ is obtained from step 702 and step 703 above in terms of bandwidth utilization and power consumption. While $R_t^*$ is an optimal cumulative reward function inherent in any communication system.

At step 707, whether the Q-loss function is minimal is determined. That is, $\mathcal{J} = E[(r_t + \gamma \max_a Q(s', a') - Q(s, a))^2]$ is minimal. Collolary, whether the estimated $R_t$ sufficiently equals to the target $R_t^*$ function. Whether the select action map $\{a_t\}$ and state $S_i$ yield a value function Q closest to the target value function set by the parameters of IoT system 100. That is, $$Q^*(s, a) = \max_{\pi} E[\gamma^t r_t \mid s, a, \pi].$$

The target values $R_t^*$ is based on the known bandwidth ($BW_0$) and threshold power consumption ($P_{th}$) and/or other system parameters such as transmission rate, speed, latency, etc.

At step 708, if the Q-loss function $\mathcal{J}$ is minimal, then issue the suggested action map $\{a_t\}$, and use this template to program the control webapp page 500 as shown in FIG. 5.

If any of the answers to step 703, 705, and 707 are NO, then step 709 is performed by introducing another action map $\{a_{t+1}\}$ and perform steps 701 to step 708 again. In some aspects of the present invention, step 709 includes storing some of the actions that have less priorities and slower speeds than the rest of the action map $\{a_t\}$ in a cache memory until these conditions in steps 703, 705, and 707 are met.

Then at step 710, a next action map $\{a_{t+1}\}$ are suggested using either Stochastic Policy Gradient (SPG) or Deterministic Policy Gradient (DGD).

At step 711, everytime the next action map $\{a_{t+1}\}$ is suggested, steps 701 to step 708 are performed again.

At step 712, after an action map $\{a_{t+1}\}$ is successfully introduced, method 500 including modifying the operating parameters of IoT devices 111-1 to 120-N is performed again by users.

Finally at step 713, occasionally or after a certain number of iterations, e.g., 10,000, the discount rate $\gamma$ and the learning rate $\alpha$ is recalculated based on the learning of the DRNN module 250.

Figure 8:
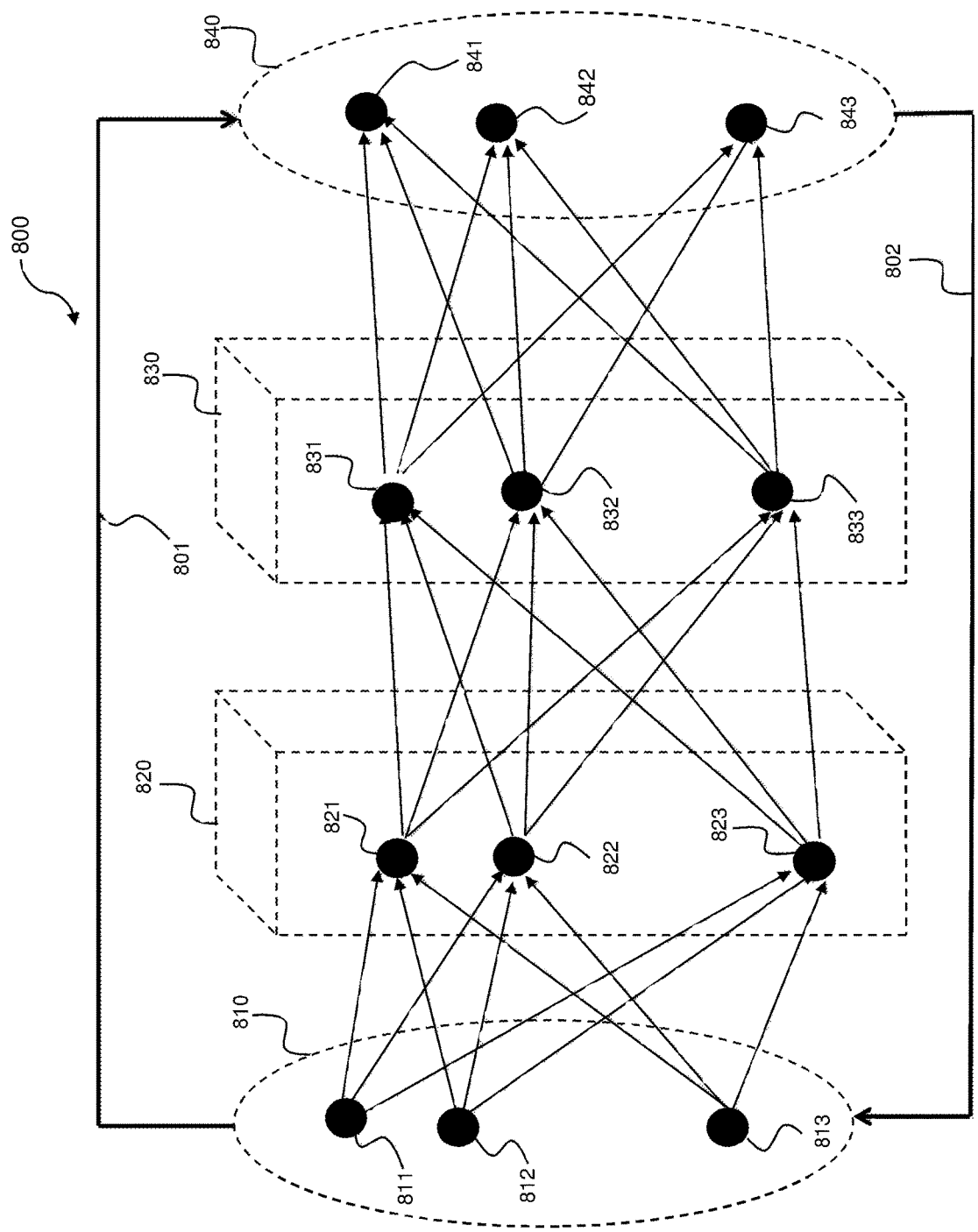
FIG. 8 is a structural layers of a deep reinforcement network for managing a plug-and-play (PnP) point to multipoint (P2MP) IoT environment including a network, IoT servers, IoT agents (agents), and different IoT devices in accordance with an exemplary embodiment of the present invention.

Now referring to FIG. 8, a deep reinforcement neural network (DRNN) 800 for managing a plug-and-play (PnP) point to multipoint (P2MP) IoT environment including two layers in accordance with an exemplary embodiment of the present invention is illustrated. DRNN 800 includes an input layer 810, a first hidden layer 820, a second hidden layer 830, and an output layer 840. Input layer 810 includes IoT devices 111-1 to 120-N as shown in FIG. 1. The object of DRNN 800 is to manage IoT device environment 100 in the most efficient, stable, and without any latency. First hidden layer 820 includes a bandwidth 821 of first IoT device 111-1, a bandwidth 822 for second IoT device 111-2, and a bandwidth 823 for IoT device 120-N. Second hidden layer 830 includes a power consumption 831 of first IoT device 111-1, a power consumption 832 for second IoT device 111-2, and a power consumption 833 for IoT device 120-N. Output stage 840 includes action map $\{a_t\}$ 843 for first integration group 111, an action map 842 for second integration group 112, and an action map $\{a_t\}$ 843 for J integration map 120.

When IoT device environment 100 are connected together, DRNN 800 first proposes an initial action map $\{a_t\}$, in a forward path 801. Then, an observation 802 is received that returns the total power consumption ($P_c$) and bandwidth ($BW_c$) of the initial action map $\{a_t\}$. An action map $\{a_t\}$ is a map indicating all connections among IoT devices 111-1 to 120-N. For example, an initial action map $\{a_t\}$ may be IoT device 111-1 is communicating with IoT devices 112-6 and 112-100 in second integration group 112 and IoT device 120-1, 120-9, and 120-27. Cumulative reward function $R_t$ for this action map $\{a_t\}$ is calculated, involving bandwidth and power consumption as described in step 703 and 705 respectively. Then a Q function and Q-loss function $\mathcal{J}$ are calculated as described in step 706. Q value function is the expected value E of all future cumulative reward function $R_t$ given an action map $\{a_t\}$ and a state $S_t$. That is, $Q_{t+1}(S_t, a_t) = Q_t(S_t, a_t) + \propto (R_{t+1} + \gamma \max(Q(S_{t+1}, a_{t+1}) - Q_t(S_t, a_t))$. Q-loss function is defined as the root means square of the difference between the target $R_t$ function and the proposed Rt function. That is $\mathcal{J} = E[(r_t + \gamma \max_a Q(s', a') - Q(s, a))^2])$. If, from observation path 802, Q-loss of initial action map $\{a_t\}$ cannot achieve the minimal Q-loss, a second action map $\{a_{t+1}\}$ is proposed and another observation is evaluated. These iterative steps (e.g., step 702, 703, and 705) are performed until the Q-loss function is minimal or within a preset range.

Continuing with FIG. 8, the next action map $\{a_{t+1}\}$ is selected either by Stochastic policy gradient of the Q-function. That is, the probability of action map $\{a_{t+1}\}$ that most likely to achieve minimal Q-loss function $\mathcal{J}$. In other aspects of the present invention, the next action map $\{a_{t+1}\}$ can be selected by either stochastic policy gradient (SPG) or deterministic policy gradient (DPG). Any IoT devices that have slower communication speed and lower priorities will be cached in a queue for later connections that obey a predetermined priority such as first come, first serve (FIFO).

From the disclosures above as illustrated in FIG. 1-FIG. 8, the present invention achieves the following objectives:

An IoT environment that can achieve plug-and-play and point to multipoint communication for all IoT devices, IoT agents regardless of their industrial standards, physical connections, and communication protocols.

After connected to any pre-existing IoT environment, the IoT agent and IoT server of the present invention are capable of rendering such pre-existing IoT environment into a plug-and-play and point-to-multipoint communication IoT environment.

A plug-and-play and point-to-multipoint platform that can provide real-time data for all IoT devices connected thereto to increase the data analytics capability and artificial intelligence/machine learning to accurately predict the behaviors of users.

Computer program code for carrying out operations for aspects of the present invention such as PnP&P2MP module 340 or DRNN application specific module 240 may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof

DESCRIPTION OF NUMERALS

100 IoT environment
101 a network such as internet, LAN, WAN, cloud
111 first integration group
111-1 IoT device such as a thermostat, a garage opener
111-2 another IoT device of the first IoT agent
111-K an $K^{th}$ IoT device of the first IoT agent
112 second integration group
112-1 IoT device connected to a second IoT agent
112-2 a second IoT device of the second IoT agent
112-L an Lth IoT device of the second IoT agent
120 third integration group
120-1 a first IoT device that is connected to the Mth hub
120-2 a second IoT device connected to the Mth IoT agent
120-N the Nth IoT device connected to the Mth IoT agent
131 connections in the first integration group 111
141 connections in the second integration group 112
151 connections in the $N^{th}$ integration group 120
161 connections between IoT agents and IoT server
200 IoT servers network
201 edge/fog/cloud network
202 communication channels between IoT agents and the network
203 communication channels between IoT agents
210 IoT server
210-1 existing (pre-connected or prelinked) IoT server
210-P $P^{th}$ IoT server (or a sub-IoT platform similar to 100)
211 microprocessor for IoT server
212 power supplies for the IoT server
213 network interface for the IoT server
214 ROM/RAM for the IoT server
215 I/O Interface
216 display device for the IoT server 217 keyboard device for the IoT server
218 audio interface for the IoT server
219 pointing device for the IoT server
220 memory device for the IoT server
221 O.S./BiOS for the IoT server
222 ANDROID
230 data repository for the IoT server
231 value data
232 replay data
240 DRNN application specific module
241 agent manager module
242 webapp configuration module
243 communication interface
244 switching Network
250 deep reinforcement neural network (DRNN)
251 RL module
252 neural network
261 SMS message from IoT server to the client device
262 client devices including laptops, computers, mobile devices
263 connections between client devices and IoT server
300 architecture of the IoT agent
300-1 first IoT agent
300-2 second IoT agent
300-M $M^{th}$ IoT agent
301 microprocessor of the IoT agent
302 electrical connections
310 power supply
311 CMOS backup battery
312 EEPROM/Flash memories
313 SIM slot
314 GPS unit
315 communication protocol broker
316 virtual map module
318 switching Network
319 external connection manager
320 memory
321 Operating System (OS)
322 DRNN data
330 PnP configuration module
331 PnP API
332 IoT device driver module
340 PnP and P2MP module
341 action connection firmware
342 device controller module
343 webapp configuration module
500 WebApp display page
501 pointing device, e.g., cursor
510 authorization section
511 username
512 password/QR scan
520 IoT device Reading Section
521 IoT agent Selector
522 IoT device Selector
530 Point to Multipoint connection setup section
531 first IoT agent selector
51-1 IoT device 111-1
531-N IoT device 111-K
531-M drop down menu
532 second IoT agent selector
532-1 IoT device 112-1
532-2 IoT device 112-2
532-N IoT device
533 $M^{th}$ IoT agent selector
533-1 IoT device 120-1
533-2 IoT device 120-2
533-N IoT device 120-N
540 IoT server set up
541 IoT server ID
541-M Dropdown list of all active IoT servers
542 AI mode ON/OFF
543 Communication channel of current IoT server
550 IoT agent set up
551 IoT agent ID
552 Plug-and-play mode ON/OFF
553 communication channel of current IoT agent
560 IoT device set up
561 IoT device set up mode ON/OFF
562 add/Remove operational parameters
563 IoT device's parameter toggle
563-M IoT device parameters drop-down menu.
800 deep reinforcement neural
801 action state
802 observations of bandwidth and power consumption
810 agents
811 IoT agent 300-1
812 IoT agent 300-2
813 IoT agent 300-M
820 hidden layer of bandwidths
821 bandwidth for first integration group 111
822 bandwidth for second integration group 112
823 bandwidth for Mth integration group 120
830 power consumption for group 111
831 power consumption for group 112
832 power consumption for group 120
840 output stage
841 output action for group 111
842 output action for group 112
843 output action for group 120

What is claimed is:

1. An Internet of Things (IoT) system, comprising:
a network;
a plurality of IoT servers coupled together and serviced by said network, each of said IoT server comprising a deep reinforcement neural network (DRNN) configured to manage a point to multipoint (P2MP) communication within an IoT environment;
a plurality of IoT agents coupled to receive an action map $\{a_i\}$ from at least one of said DRNN; and
a plurality of IoT devices electrically coupled to said plurality of IoT agents, wherein at least one IoT servers and at least one IoT agent, when coupled to said network, are operable to establish a plug-and-play and point to multipoint (PnP & P2MP) communication in said IoT environment whereby said plurality of IoT devices, said plurality of IoT servers, and said plurality of IoT agents communicate with one another in said plug-and-play and point to multipoint manner in accordance with said action map $\{a_i\}$ derived from a cumulative reward function $R_t$ expressed in an equation:

$$\operatorname*{argmax}_{a_t} Q(s, a, \pi)$$

wherein Q is a value function, s is a state of connectivity within said PnP & P2MP communication of said IoT environment, a denotes said action map $\{a_i\}$, and argmax is a function maximizing an expected value of a future reward equation Q(s,a) defined as $Q(s, a)=E[R_t|(s, a)]$; wherein said reward function $R_t$ is a function of aggregate bandwidths, transmission rate, and total power consumption used in said action map {$a_i$} that meets bandwidth, transmission rate, and power consumption requirements.

2. The system of claim 1 wherein when said action map {$a_i$} does not satisfy said bandwidth and power consumption requirements, each of said plurality of IoT agents is configured to change said PnP & P2MP communication state s and said action map {$a_i$} in a direction of descending policy gradient which is defined as a decreasing Q-loss function, said Q-loss function being a root means square of the difference between a target reward function $R_t^*$ and said reward function $R_t$ asssociated with said action map {$a_i$}.

3. The system of claim 2 wherein when said action map {$a_i$} does not satisfy said bandwidth and power consumption requirements, each of said plurality of IoT agents is configured to prioritize said state s and said action map {$a_i$} by storing those connections in said state s and said action map {$a_i$} that have either slower transmitting speeds or less priorities in a cache memory for future connections until said action map {$a_i$} satisfies said bandwidth and said power consumption requirements.

4. The system of claim 3 wherein said at least one IoT agent is configured to restore said connections in said PnP & P2MP communication state s and said action map {$a_i$} that have either said slower transmitting speeds or less priorities and add said connections into said action map {$a_i$} whenever said aggregate bandwidths and power consumptions decrease.

5. The system of claim 4 wherein said at least one IoT server further comprises:

a Q-function data storage configured to store said future reward equation Q(s,a) and said Q-loss function;

a value data storage for storing power consumption and bandwidth for each of said plurality of IoT devices in said action map {$a_i$}; and a processor for executing a deep reinforcement module operable to:

(i) generate said action map {$a_i$};

(ii) receive observations regarding bandwidths and power consumptions and calculate said reward function $R_t$, said $$\underset{a_t}{\mathrm{argmax}} Q(s, a, \pi);$$

(iii) if said $$\underset{a_t}{\mathrm{argmax}} Q(s, a, \pi)$$

is not achieved, then select another action map {$a_i$} that has the highest probability of achieving $$\underset{a_t}{\mathrm{argmax}} Q(s, a, \pi)$$

that meets both said bandwidth and power consumption requirements; otherwise, use said action map {$a_i$} to program a webapp configuration program.

6. The system of claim 5 wherein said step (iii) of selecting another action map {$a_i$} further comprises caching some of actions $a_k$ that have lower priorities and slower transmitting speeds than other actions in said action map {$a_i$} so that said $$\underset{a_t}{\mathrm{argmax}} Q(s, a, \pi)$$

is achieved; then include said actions $a_k$ in said action map {$a_i$} in a predetermined priority order at a later time when said probability of achieving $$\underset{a_t}{\mathrm{argmax}} Q(s, a, \pi)$$

is highest.

7. The system of claim 6 wherein said at least one IoT agent further comprises a processor for executing a plug-and-play module and a configuration module, said plug-and-play module configured to:

(a) detect whether said plurality of IoT devices, said plurality of IoT agents, and/or said plurality of IoT servers are each included in said webapp configuration program;

(b) if said plurality of IoT devices, said plurality of IoT agents, and/or said plurality of IoT servers are each included in said webapp configuration program, then control said plurality of IoT devices, said plurality of IoT agents, and/or said plurality of IoT servers in said plug-and-play and point to multipoint manner in accordance with setups and instructions of said webapp configuration program, wherein said setups and instructions of said webapp configuration program follows said action map {$a_i$} output by said at least one DRNN; otherwise, (c) if any of said plurality of IoT devices, said plurality of IoT agents, and/or said plurality of IoT servers are not included in said webapp configuration program, then detect operating parameters, physical connections, communication protocols, and industrial standards for each of said plurality of IoT devices, said plurality of IoT agents, and/or said plurality of IoT servers using a plug-and-play application program interface (API) and then use said configuration module to insert said detected operating parameters, said communication protocols, and said industrial standards into said webapp configuration program is configured to establish said PnP & P2MP communication in said IoT evironment in accordance with said action map {$a_i$} output by said at least one DRNN.

8. The system of claim 7 wherein said configuration module enables users to change and add said operating parameters of said plurality of IoT devices, said plurality of IoT agents, and said plurality of servers; wherein said webapp configuration program is configured by each of said users for specific operations of said plurality of IoT devices, said plurality of IoT agents, and said plurality of IoT servers.

9. The system of claim 7 wherein said at least one IoT agentfurther comprises a connections firmware configured to detect and connect said plurality of IoT devices, said plurality of IoT agents, and said plurality of IoT servers using different said physical connections; wherein said physical connections comprise a Zwave connection, a Zigbee connection, a Bluetooth connection, an Ethernet connection, a wifi connection, a cellular connection using a SIM, a LORA connection, and a near field communication (NFC) connection; wherein said communication protocols comprise a HTTP protocol, a websocket protocol, and a MQTT protocol.

10. The system of claim 9 wherein said connections firmware detects said physical connections by:
using a detector to detect an operating frequency, said operating parameters, and said industrial standards of each of said plurality of IoT devices, said plurality of IoT agents, and said plurality of IoT servers; and
wherein said connections firmware uses-a driving circuit and a switching network to adaptively set up said physical connections among said plurality of IoT devices, said plurality of IoT agents, and said plurality of IoT servers by retrieving a device driver from a memory and loading said device driver into said driving circuit based on results from said step of detecting said operating frequency, said operating parameters, and said industrial standards.

11. The system of claim 10 wherein said detector comprises a barcode scanner, a QR code scanner, an infrared scanner, and an RFID reader.

12. The system of claim 2 wherein said at least one IoT agent further comprises an IoT device controller operable to manage said plug-and-play and point to multipoint communication for said plurality of IoT devices by creating virtual computing nodes between said at least one IoT agent and said plurality of IoT devices when said plurality of IoT devices are first electrically coupled to and detected by said at least one IoT agent.

13. The system of claim 7 wherein said at least one IoT agent and said at least one IoT server are configured to form a virtual infrastructure for said plurality of IoT agents and said plurality of IoT devices, when said plurality of IoT devices have industrial standards, physical connections, and communication protocols different from those of said at least one IoT agent and said at least one IoT server; wherein said virtual infrastructure comprises virtual computing nodes; wherein said virtual infrastructure and said virtual computing nodes are embedded into said webapp configuration program for managing said PnP & P2MP communication in said IoT environment.

14. The system of claim 1 wherein said at least one IoT server further comprises a data repository which further comprises:
a universal real-time data storage for storing real-time data regarding present statuses of said plurality of IoT devices;
a universal past data storage for storing past data of said plurality of IoT devices.

15. The system of claim 14 wherein said at least one IoT server further comprises a processor for executing:
a webapp module configured to create said webbapp configuration program;
a data handler module configured to send/receive data to/from said plurality of IoT devices; and
an artificial intelligence and machine learning module configured to receive said universal past and said real-time data from said data repository to perform data analytics that predicts operational behaviors of said plurality of IoT devices.

16. The system of claim 7 wherein said at least one IoT server further comprises a switching network configured to enable said plurality of IoT agents and said plurality of IoT devices to communicate to one another in said point to multipoint manner.

* * * * *